(12) United States Patent
DeWeese et al.

(10) Patent No.: US 8,918,818 B2
(45) Date of Patent: Dec. 23, 2014

(54) TELEVISION CHAT SYSTEM

(71) Applicant: United Video Properties, Inc., Santa Clara, CA (US)

(72) Inventors: Toby DeWeese, Tulsa, OK (US); Pamela L. McKissick, Mounds, OK (US); William L. Thomas, Evergreen, CO (US); Michael D. Ellis, Boulder, CO (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 14/222,489

(22) Filed: Mar. 21, 2014

(65) Prior Publication Data

US 2014/0208367 A1 Jul. 24, 2014

Related U.S. Application Data

(63) Continuation of application No. 13/900,019, filed on May 22, 2013, which is a continuation of application No. 12/880,326, filed on Sep. 13, 2010, now abandoned, which is a continuation of application No. 10/918,753, filed on Aug. 12, 2004, now abandoned, which is a continuation of application No. 09/356,270, filed on Jul. 16, 1999, now abandoned.

(60) Provisional application No. 60/099,301, filed on Aug. 26, 1998.

(51) Int. Cl.
*H04N 5/445* (2011.01)
*H04N 21/431* (2011.01)
(Continued)

(52) U.S. Cl.
CPC .......... *H04N 21/431* (2013.01); *H04N 21/6581* (2013.01); *H04N 21/632* (2013.01);
(Continued)

(58) Field of Classification Search
CPC .......... H04N 21/4756; H04N 21/4788; H04N 21/632; H04N 21/6581
See application file for complete search history.

(56) References Cited

U.S. PATENT DOCUMENTS

| 5,014,125 A | 5/1991 | Pocock et al. |
| 5,519,433 A | 5/1996 | Lappington et al. |

(Continued)

FOREIGN PATENT DOCUMENTS

| EP | 083498 A2 | 7/1983 |
| EP | 0834798 | 4/1998 |

(Continued)

OTHER PUBLICATIONS

"Excite@Home Sets Voice Offerings," Broadband Week, p. 45, Jul. 5, 1999.

(Continued)

*Primary Examiner* — Dominic D Saltarelli
(74) *Attorney, Agent, or Firm* — Ropes & Gray LLP

(57) ABSTRACT

A television chat system that allows television viewers to engage in real-time communications in chat groups with other television viewers while watching television. Users of the television chat system may engage in real-time communications with other uses who are currently watching the same television program or channel. The system allows real-time communications in a chat group to be transmitted between users at user television equipment devices via a television distribution facility. The television chat system permits users to join chat groups related to television programs, channels, or categories of programs that the user may be interested in. Real-time communications may be textual messages, audio communications, or video communications. The television chat system may also allow users to send chat requests to ask other users to enter a chat group, and permits users to establish chat groups that television viewers are permitted to join.

22 Claims, 32 Drawing Sheets

(51) Int. Cl.
| | |
|---|---|
| *H04N 21/658* | (2011.01) |
| *H04N 21/63* | (2011.01) |
| *H04L 12/18* | (2006.01) |
| *H04N 7/14* | (2006.01) |
| *H04N 7/173* | (2011.01) |
| *H04N 21/24* | (2011.01) |
| *H04N 21/454* | (2011.01) |
| *H04N 21/2665* | (2011.01) |
| *H04N 21/4223* | (2011.01) |
| *H04N 21/462* | (2011.01) |
| *H04N 21/475* | (2011.01) |
| *H04N 21/4782* | (2011.01) |
| *H04N 21/4786* | (2011.01) |
| *H04N 21/4788* | (2011.01) |
| *H04N 21/81* | (2011.01) |
| *H04N 21/84* | (2011.01) |

(52) U.S. Cl.
CPC .......... *H04L 12/1818* (2013.01); *H04N 7/147* (2013.01); *H04N 7/17318* (2013.01); *H04N 21/2408* (2013.01); *H04N 21/454* (2013.01); *H04N 21/2665* (2013.01); *H04N 21/4223* (2013.01); *H04N 21/4316* (2013.01); *H04N 21/4622* (2013.01); *H04N 21/4751* (2013.01); *H04N 21/4755* (2013.01); *H04N 21/4756* (2013.01); *H04N 21/4758* (2013.01); *H04N 21/4782* (2013.01); *H04N 21/4786* (2013.01); *H04N 21/4788* (2013.01); *H04N 21/812* (2013.01); *H04N 21/84* (2013.01); *H04N 21/8173* (2013.01)
USPC ............................................. 725/61; 725/38

(56) References Cited

U.S. PATENT DOCUMENTS

| | | | |
|---|---|---|---|
| 5,559,549 A | 9/1996 | Hendricks et al. | |
| 5,561,709 A | 10/1996 | Remillard | |
| 5,583,927 A | 12/1996 | Ely et al. | |
| 5,589,892 A | 12/1996 | Knee et al. | |
| 5,600,364 A | 2/1997 | Hendricks et al. | |
| 5,657,072 A | 8/1997 | Aristides et al. | |
| 5,694,163 A | 12/1997 | Harrison | |
| 5,764,916 A | 6/1998 | Busey et al. | |
| 5,781,226 A | 7/1998 | Sheehan | |
| 5,793,365 A | 8/1998 | Tang et al. | |
| 5,796,393 A | 8/1998 | MacNaughton et al. | |
| 5,805,763 A | 9/1998 | Lawler et al. | |
| 5,812,123 A | 9/1998 | Rowe et al. | |
| 5,818,441 A | 10/1998 | Throckmorton et al. | |
| 5,828,839 A | 10/1998 | Moncreiff | |
| 5,833,468 A | 11/1998 | Guy et al. | |
| 5,841,468 A | 11/1998 | Wright | |
| 5,844,615 A | 12/1998 | Nuber et al. | |
| 5,905,493 A | 5/1999 | Belzer et al. | |
| 5,937,404 A | 8/1999 | Csaszar et al. | |
| 5,956,693 A | 9/1999 | Geelings | |
| 5,974,446 A | 10/1999 | Sonnenreich et al. | |
| 5,988,078 A | 11/1999 | Levine | |
| 6,002,394 A | 12/1999 | Schein et al. | |
| 6,014,136 A | 1/2000 | Ogasawara et al. | |
| 6,018,768 A | 1/2000 | Ullman et al. | |
| 6,021,433 A | 2/2000 | Payne et al. | |
| 6,081,830 A | 6/2000 | Schindler | |
| 6,172,677 B1 | 1/2001 | Stautner et al. | |
| 6,175,619 B1 | 1/2001 | DeSimone | |
| 6,177,931 B1 | 1/2001 | Alexander et al. | |
| 6,184,878 B1 | 2/2001 | Alonso et al. | |
| 6,339,784 B1 | 1/2002 | Morris et al. | |
| 6,388,714 B1 | 5/2002 | Schein et al. | |
| 6,499,053 B1 | 12/2002 | Marquette et al. | |
| 6,510,557 B1 | 1/2003 | Thrift | |
| 6,545,722 B1 | 4/2003 | Schultheiss et al. | |
| 6,677,968 B1 | 1/2004 | Appelman | |
| 6,692,359 B1 * | 2/2004 | Williams et al. | 463/42 |
| 7,028,326 B1 * | 4/2006 | Westlake et al. | 725/39 |

FOREIGN PATENT DOCUMENTS

| | | |
|---|---|---|
| WO | WO-94/06230 A1 | 3/1994 |
| WO | WO-94/14284 A1 | 6/1994 |
| WO | WO-96/25006 A1 | 8/1996 |
| WO | WO-96/41478 A1 | 12/1996 |
| WO | WO-97/35258 A1 | 9/1997 |
| WO | WO-97/38529 A1 | 10/1997 |
| WO | WO-98/10589 A1 | 3/1998 |
| WO | WO-98/17064 A1 | 4/1998 |
| WO | WO-98/21664 A1 | 5/1998 |
| WO | WO-98/28698 A1 | 7/1998 |
| WO | WO-98/29818 A1 | 7/1998 |

OTHER PUBLICATIONS

"Intel and NBC Work to Speed the Development of Enhanced DTV," printed from the Internet at http://www.intel.com/pressroom/archive/releases/Cn041999.htm on Jul. 15, 1999.

"WebTV Plus Features: E-mail," printed from the Internet at http://www.webtv.net/products/plus/wantmore3.html on Jul. 15, 1999.

"WebTV Plus Features: TV Features," printed from the Internet at http://www.webtv.net/products/plus/wantmore.html on Jul. 15, 1999.

"WebTV Plus Service," printed from the Internet at http://www.webtv.net/products/plus/ on Jul. 15, 1999.

Fixmer, Rob, "Windows 98 Feature Combines TV, Terminal and the Internet," New York Times, Aug. 18, 1998.

The Advanced TV Enhancement from homepage printed from the Internet at http://atvef.com on Jul. 15, 1999.

The Wink Communications Company homepage, printed from the Internet at http://www.wink.com/company/index.html on Jul. 13, 1999.

Extended European Search Report dated Jan. 21, 2011 in EP07075232.4.

* cited by examiner

FIG. 6

TELEVISION CHAT SYSTEM

CROSS-REFERENCE TO RELATED APPLICATION(S)

This patent application is a continuation of U.S. patent application Ser. No. 13/900,019, filed May 22, 2013, which is a continuation of U.S. patent application Ser. No. 12/880,326, filed Sep. 13, 2010 (now abandoned), which is a continuation of U.S. patent application Ser. No. 10/918,753, filed on Aug. 12, 2004 (now abandoned), which is a continuation of U.S. patent application Ser. No. 09/356,270, filed on Jul. 16, 1999 (now abandoned), which claims the benefit of U.S. Provisional Application No. 60/099,301, filed Aug. 26, 1998, all of which are hereby incorporated by reference herein in their entireties.

BACKGROUND OF THE INVENTION

This invention relates to television chat systems, and more particularly, to techniques for supporting chat communications in a television environment that may include an interactive television program guide.

A popular aspect of the Internet relates to on-line chat services. A user of such a service may join a chat group to discuss any of a variety of topics. The participants in a chat are linked to each other over the Internet. The participants in a chat may view the comments of other participants in real time as the other participants type in their comments using their computers.

Television programs are often discussed in chat groups. However, there is generally no way in which a user of a traditional chat service may easily view a television program while participating in a chat about that program. A user might locate a television in the same room as the user's personal computer, but such an arrangement would be awkward to view. Moreover, many households locate their televisions in the living room, but are reluctant to locate their computers in the living room.

Although personal computers may be provided with tuner cards that allow television signals to be displayed on the computer monitor, many television viewers would prefer to view television on a traditional television. Televisions generally offer greater viewing areas than computer monitors, so that users need not sit nearly as close to a television screen as they would a computer monitor. Televisions are also typically located in rooms within the home that are more suitable for watching television than where computers are typically located.

A system that attempts to integrate aspects of the Internet with the television viewing experience is available from WebTV Networks, Inc. of Palo Alto, Calif. The WebTV system permits television viewers to access the Internet through a WebTV Plus Receiver connected to their television sets. The WebTV Plus Receiver enables users to surf the World Wide Web on their television by connecting their televisions to the web-based WebTV Network through a standard phone line. The WebTV System permits users to view television program listings and web sites related to television programs that appear in the program listings.

The WebTV system also provides TV Crossover Links that allow users to access web sites that are related to television programs. The WebTV Plus Receiver detects data such as web links (i.e., universal resource locators (URLs)) that is embedded in the video broadcast and notifies users with a TV Crossover Link watermark on their television screens. The TV Crossover Links permit users to link to web sites through the Internet related to the television program that the user is watching. The user can view the web site and the television program simultaneously through the WebPIP picture-in-picture function. If the web site supports chat features, the user might then engage in an on-line chat through the Internet while watching a television program. There is nothing in the WebTV system, however, that ensures that participants in this type of web-based chat are watching the same television programs as the user. The chat may therefore be considerably less focused than it would be if all the chat participants were actively viewing the same television program.

During certain television programs, the MTV television channel displays a scrolling chat message overlay on top of the current MTV television program. Users can link to the chat that is being displayed over the Internet. However, only those users whose television sets are located in the same room as their personal computers may participate in the chat. Moreover, all viewers of the television program must watch the chat, even if they are not interested in participating. The system can only accommodate one chat group, so if more than a few viewers wish to chat, it may be difficult or impossible to follow a particular chat thread of interest.

Interactive television program guides implemented on set-top boxes allow users to view television program listings on their televisions. Such program guides allow users to view television program listings in different display formats and to perform various other functions. For example, a user may instruct the program guide to display a channel-ordered grid of current program listings. The user may also use the program guide to search for programs in a desired programming category such as sports, movies, news, or the like. If desired, the program guide may be used to order pay-per-view programming. Interactive program guides have not, however, been capable of providing chat related features.

Thus, previously known systems have generally not provided television viewers with the opportunity to engage in real-time chat communications with other television viewers without relying solely on the Internet. Previously known systems also have not provided television viewers with the opportunity to engage in chat groups consisting exclusively of other viewers of a television program or channel. Previously known interactive television program guides have not supported chat features.

SUMMARY OF THE INVENTION

It is an object of the present invention to provide a television chat system that does not rely solely on the Internet to form chat connections and that permits users who are watching a television program or channel to engage in real-time chat communications with each other.

It is also an object of the present invention to provide an interactive television program guide system that supports chat.

These and other objects of the invention are accomplished in accordance with the principles of the present invention by providing a television chat system that allows television viewers to engage in real-time communications in chat groups with other television viewers while watching television. Users of the television chat system may engage in real-time communications with other users who are currently watching the same television program or channel.

The system allows real-time communications in a chat group to be transmitted between users at user television equipment devices via a server. For example, a cable system headend containing a server may transmit such communications over coaxial cables that also carry television signals or other such communications paths. The system therefore may eliminate the need for additional communications paths separate from the paths that carry television signal broadcast channels for the transmission of chat communications.

The television chat system of the present invention permits users to join chat groups related to television programs, channels, or categories of programs that the user may be interested in. Real-time communications may be textual messages, audio communications, or video communications.

The television chat system may also allow users to send chat requests to ask other users to enter a chat group related to a television program or channel. A chat request may be displayed automatically upon a recipient's television screen or may be accessed at the recipient's request. The system also permits users to establish chat groups that television viewers are permitted to join.

The television chat system may be based on an interactive television program guide implemented on the set-top box. If desired, the system may be implemented on other suitable user television equipment such as a satellite receiver, an advanced television receiver (e.g. a high definition television or HDTV receiver), a television into which set-top box circuitry is integrated or the like.

Further features of the invention, its nature and various advantages will be more apparent from the accompanying drawings and the following detailed description of the preferred embodiments.

BRIEF DESCRIPTION OF THE DRAWINGS

FIG. 6 is a depiction of an illustrative display screen for entering non-household user information in accordance with the present invention.

DETAILED DESCRIPTION OF THE PREFERRED EMBODIMENT

Figure 1A:
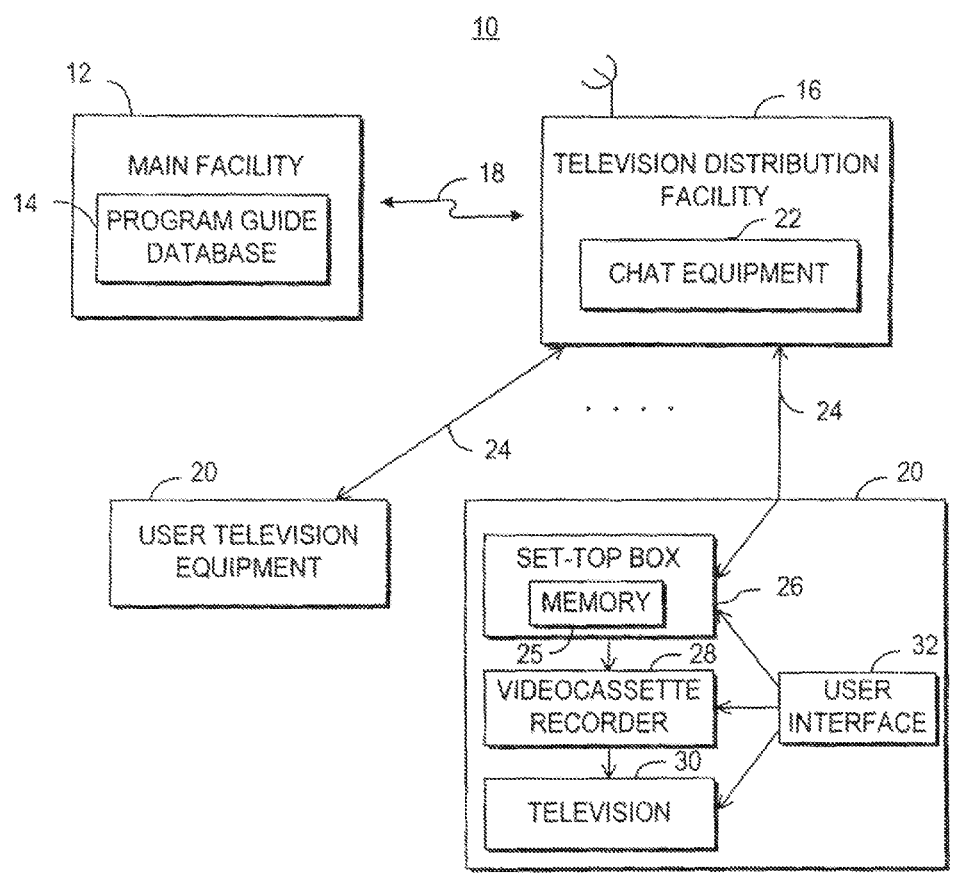
FIG. 1A is a diagram of a television chat system in accordance with the present invention.

An illustrative television chat system 10 in accordance with the present invention is shown in FIG. 1A. Main facility 12 may contain a program guide database 14 for storing program guide information such as television program guide listings data, pay-per-view ordering information, etc. Database 14 allows system 10 to support an interactive television program guide if desired. Although the television chat features of the present invention may be provided using a television chat system without a program guide, certain aspects of the invention will be described primarily in the context of an interactive television program guide system configuration for specificity and clarity. Information from database 14 may be transmitted to television distribution facility 16 via communications link 18. Link 18 may be a satellite link, a telephone network link, a fiber optic link, a cable link, a microwave link, a combination of such links, or any other suitable communications path.

Television distribution facility 16 is a facility for distributing television signals to users, such as a cable system headend, a broadcast distribution facility, or a satellite television distribution facility. Only one television distribution facility 16 is shown in FIG. 1A to avoid over complicating the drawings. In general, however, main facility 12 distributes information to multiple television distribution facilities.

The program guide information transmitted by main facility 12 to television distribution facility 16 includes television program listings data such as program times, channels, titles, descriptions, etc. The information transmitted from main facility 12 may also include information on the chat groups that are available for particular television programs or channels.

If desired, some of the program guide data and other information may be provided using data sources at facilities other than main facility 12. For example, data relating to available program-specific chat groups may be provided by a television channel chat facility or other facility that is separate from main facility 12 and television distribution facility 16.

Television distribution facility 16 distributes program guide data and other information to the user television equipment 20 of multiple users via communications paths 24. Communication paths 24 preferably have sufficient bandwidth to allow television distribution facility 16 to distribute scheduled television programming, pay programming, real-time communications, chat requests and other video and audio information to user television equipment 20 in addition to non-video program guide information and communications. The real-time communications supported by communication paths 24 may be text-based or, if more bandwidth is available, may be audio or video communications.

Multiple television and audio channels (analog, digital, or both analog and digital) may be provided to set-top boxes 26 via communications paths 24. If each path 24 includes a number of traditional analog television channels, one or more of these channels may be used to support a number of digital channels. The bandwidth of each analog channel that is used to support digital channels may support ten or more of such digital channels. Two-way digital channels require more bandwidth than one-way digital channels. Such two-way digital channels may support two-way real-time communications between set-top boxes 26 and the television distribution facility 16. If two-way communications between set-top boxes 26 and television distribution facility 16 involve only text or audio signals, the band width required to support such two-way communications may be substantially less than the width required to support two-way communications involving video.

Real-time communications and chat requests may be distributed along communications path 24 using any number of suitable techniques. For example, textual chat communications and chat requests may be distributed using out-of-band channels on paths 24 using out-of-band modulators. Video or audio chat communications may be more efficiently transmitted using one or more digital channels on path 24. Such digital channels may also be used for distributing text and graphics.

Dedicated digital or analog channels in communications paths 24 may be used for the transmission of real-time communications and chat requests. Such dedicated channels are separate from the channels used for transmitting television program broadcast signals to the user television equipment.

Because communications paths 24 support transport of real-time communications and chat requests between user television equipment 20 and television distribution facility 16, the arrangement of system 10 eliminates the need for separate telephone lines connected to user television equipment 20 to transmit real-time communications (although such telephone lines could be used with certain aspects of the invention if desired). If desired, television programming may be transmitted to user television equipment 20 along one communications path such as a cable link to a cable headend, while real-time communications are transmitted between user television 20 along a second communications path such as a satellite link.

Each television distribution facility 16 may distribute real-time communications and chat requests at least between the user television equipment devices that are associated with that facility. A television distribution facility may establish a forum for real-time communications called television chat groups using chat equipment 22 such as a chat server. A television chat group (sometimes referred to herein as simply a chat group) is an electronic forum in which a group of users are engaged in a real-time discussion through their user television equipment. Real-time communications such as chat messages are sent back and forth between the participants of the chat group.

Television distribution facility 16 preferably has a server or other suitable computing equipment or audio or video equipment (herein collectively referred to as chat equipment 22) for supporting real-time communications and the transmission of chat requests between users. For clarity, certain aspects of the invention are simply described as being implemented using a chat server. If desired, however, these features may also typically be implemented using chat equipment such as equipment based on audio and video conferencing equipment (i.e., audio bridges, video bridges and the like or using chat equipment based on other suitable computing equipment or a combination thereof. The chat equipment 22 (e.g., a chat server) is capable of handling real-time communications and chat requests involving text, graphics, video, or audio data. If desired, the bandwidth requirements of chat equipment 22 may be reduced by restricting communications to text and audio or only text, rather than including video. Chat equipment 22 in television distribution facility 16 may be configured in a client-server arrangement in which each piece of user television equipment 20 acts as a client processor.

Each user has a receiver, which is typically a set-top box such as set-top box 26, but which may also be other suitable television equipment into which circuitry similar to set-top box circuitry has been integrated. For example, user television equipment 20 may be based on an advanced television receiver such as a high-definition television (HDTV) receiver or other such television-based platform. A set-top box may include a DOCSIS modem for use in two-way communication to and from a server or television distribution facility. As defined herein, user television equipment 20 does not include equipment based on personal computers. For clarity, the present invention will be described primarily in the context of user television equipment 20 that is based on set-top boxes 26. As shown in FIG. 1A, each set-top box 26 may have memory 25. Memory 25 may be used, for example, for maintaining a database of program listings data.

Program guide information may be distributed to set-top boxes 26 continuously (in real-time), periodically, on request (using a client-server arrangement), or using a combination of these techniques. Real-time communications and chat requests may be distributed to set-top boxes 26 in real-time. Television distribution facility 16 may also receive real-time communications or chat requests from set-top boxes 26 in real-time or periodically. Main facility 12 preferably contains a processor to handle information distribution tasks. Each set-top box 26 preferably contains a processor to handle tasks associated with implementing an interactive television program guide application containing chat features (hereinafter sometimes referred to as a program guide) or an independent chat application on the set-top box 26. Television distribution facility 16 preferably contains one or more processors (e.g., in chat equipment 22) for tasks associated with the distribution of real-time communications and chat requests and for tasks associated with providing program guide data to the program guide on the set-top boxes.

It should be understood that some or all of the functions of the program guide or the chat set-top box application hereinafter described may be integrated into an operating system on the set-top box, implemented as a stand-alone application on the set-top box, or performed by chat equipment (e.g. a server, video bridge or audio bridge) operating at the television distribution facility or separate from the television distribution facility. In a client server architecture, the set-top box sends data or requests to the server for processing. The server can store data and send the results of a request back to the set-top box for further processing, display, or storage. Any of the functionality of the set-top box application hereinafter described may be implemented on client-server architecture.

Various mechanisms may be used for launching a chat application from a program guide application on the user's set-top box. One mechanism involves using a hot link to launch the chat application. Hot linking involves invoking a non-program-guide application such as a chat application with information such as a web site address, e-mail address, program title, chat group, or other information that has been preselected based on the current content of the program guide or status of set-top box 26. For example, if the user is watching a program, viewing a program listing, viewing the description of a program, or taking other action within the program guide related to a given program, channel, type of channel, or the like and the user directs the program guide to launch a non-program-guide application, the program guide may launch that non-program-guide application and direct that non-program-guide to take an action related to the given program, channel, type of channel, or the like.

Hot links may be activated by dedicated buttons, a launch button, menu options, or any other suitable technique. For example, a remote control may be provided with a dedicated chat button, and similar buttons associated with other non-program-guide applications. When the user presses the chat button, the program guide launches the chat application and directs the chat application to set up a chat group with other users or a character in the program, or join the user to an existing chat group. Further features of an illustrative hot linking system are described in Ellis et al. U.S. patent application Ser. No. 09/346,134, filed concurrently herewith, which is hereby incorporated by reference herein in its entirety.

Each set-top box 26 is typically connected to an optional videocassette recorder (VCR) 28 or other storage device in the home or at a remote location so that selected television programs and/or chat sessions may be recorded. When a user indicates to the set-top box application to record a TV program which has one or more associated chat sessions, the application may record the chat session along with the audio and video for the program. When the user plays back the program, the chat session may be accessible to view, although not to actively participate in. The chat system may be configured to play back the chat session in a format selected by the user. For example, the chat session may be played back as an overlay on top of the program, or the program and the chat session may be displayed concurrently in reduced size windows on the TV screen. Also, a user may be able to indicate to the set-top box application at any time to record a chat session by itself, without recording the program. That chat session may be stored (whether text, audio, video, or a combination), and viewed at a later time. Programs and chat sessions may also be recorded, for example, on a DVD device, a hard disk in the set-top box, or on a remote server.

Each videocassette recorder 28 (or set-top box 26) is connected to a television 30. Further features of a program recording system are described in Ellis et al. U.S. patent application Ser. No. 09/332,244 filed Jun. 11, 1999, and Hassell et al. U.S. patent application Ser. No. 09/157,256 filed Jun. 17, 1998, which are hereby incorporated by reference herein in their entirety. To record a program, set-top box 26 tunes to a particular channel and sends control signals to videocassette recorder 28 (e.g., using an infrared transmitter) that direct videocassette recorder 28 to start and stop recording at the appropriate times.

During the use of the television chat systems, set-top box 26 displays real-time communications and chat requests on television 30. If the television chat system includes an interactive television program guide, the interactive television program guide may display program listings on television 30. The program guide may also be used to display the real-time communications and chat requests. Each set-top box 26, videocassette recorder 28, and television 30 may be controlled by one or more user interfaces 32 which may involve a remote control, mouse, trackball, microphone, digital video camera, dedicated set of buttons, etc.

Figure 1B:
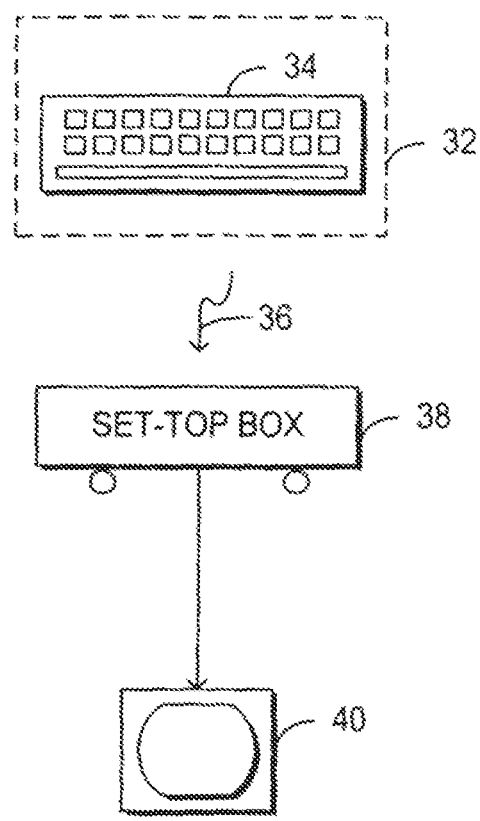
FIG. 1B is a diagram of user television equipment having a user interface based on a wireless keyboard in accordance with the present invention.

As shown in FIG. 1B, user interface 32 may contain a wireless keyboard 34 that sends signals 36 (e.g. infrared signals) to set-top box 38, which is connected to television 40. The user's input may be displayed as part of a display screen on television 40 as the input is entered through wireless keyboard 34. If television chat system 10 is based on an interactive television program guide, the display screen provided on television 40 by set-top box 38 may be on an interactive television program guide display screen containing, for example, program listings.

Figure 1C:
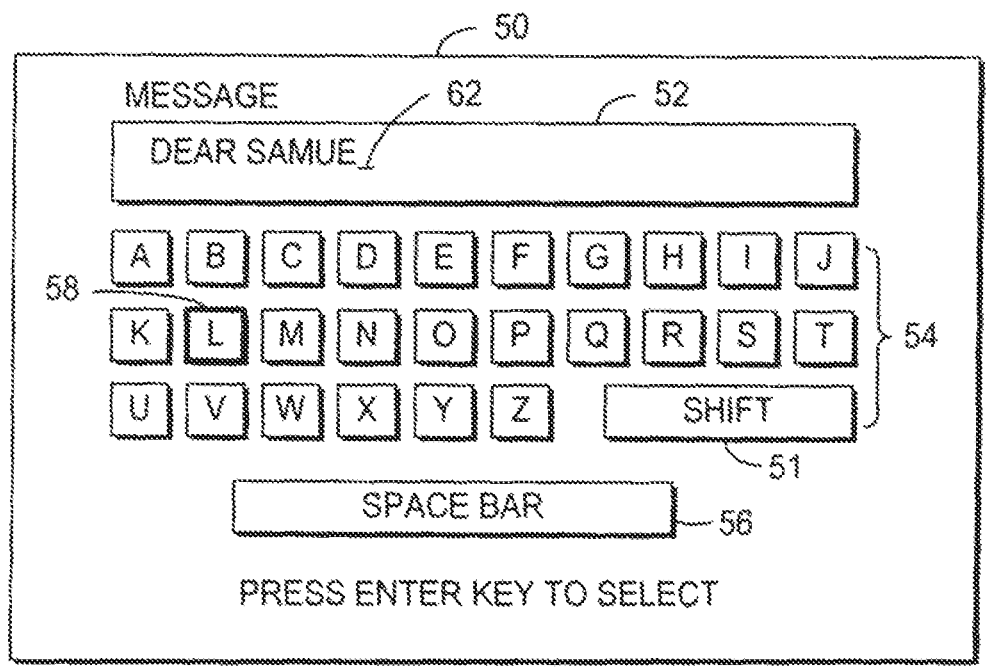
FIG. 1C is a diagram of a television screen keyboard user interface in accordance with the present invention.

User interface 32 may also be based on a television screen keyboard 50 as illustrated in FIG. 1C. The user can select letters from the displayed alphabet to compose a message 52. In particular, the user may select letters from alphabet keys 54 and spaces from space bar 56. The user may select a letter so that it becomes highlighted (such as letter L 58) by pressing arrow keys and an enter (or OK or Select) key on a remote control. Pressing the enter key on the remote control directs the program guide containing chat features or the independent chat application to place the selected letter adjacent to cursor 62. The user may select SHIFT option 51 to place a capital letter in message 52. In this way, a user can compose the text of a chat message.

Figure 1D:
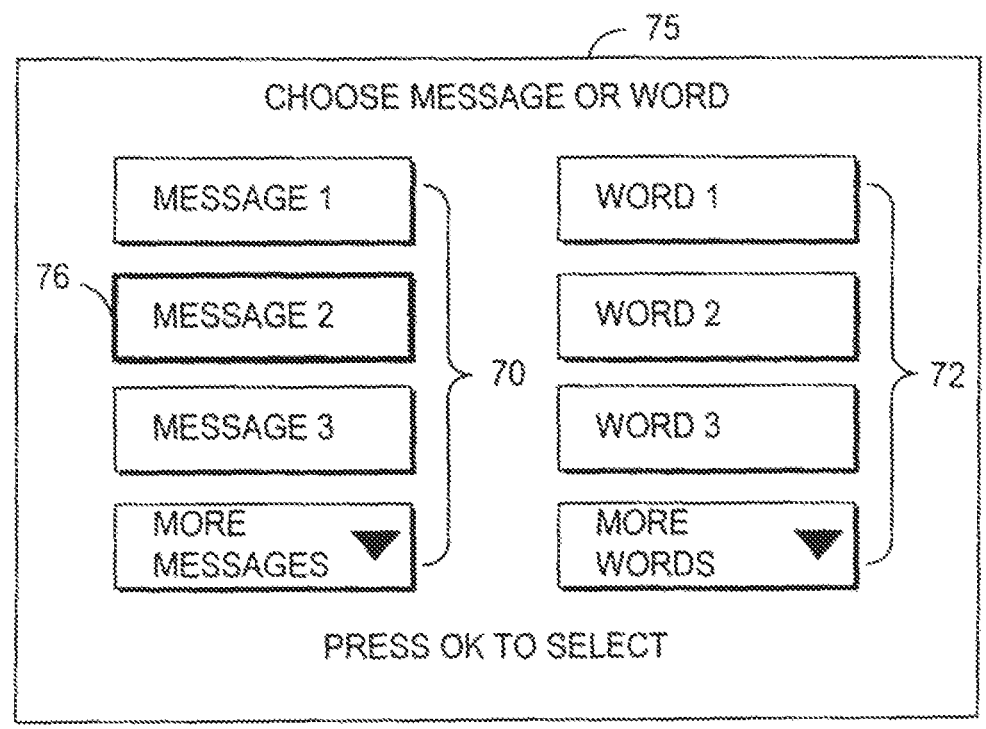
FIG. 1D is a depiction of an illustrative display screen containing a list of standard messages or words in accordance with the present invention.

If desired, the user may compose messages by selecting from a list of standard messages 70 or words 72 displayed in a display screen such as display screen 75, as shown in FIG. 1D. A word or message can be selected by pressing arrow keys on a remote control to place highlight region 76 on top of a particular word or message such as message 2 in FIG. 1D. The user can then select the highlighted word or message by pressing a remote control enter (or select or OK) key.

System 10 allows users at user television equipment 20 to engage in television program-related real-time chat communications while watching television, without the expense and complexity of learning to operate a personal computer and the software that is associated with it. In addition, System 10 allows users to retain the high video quality and channel range of television viewing while participating in real-time chat discussions with similarly situated users.

Figure 2A:
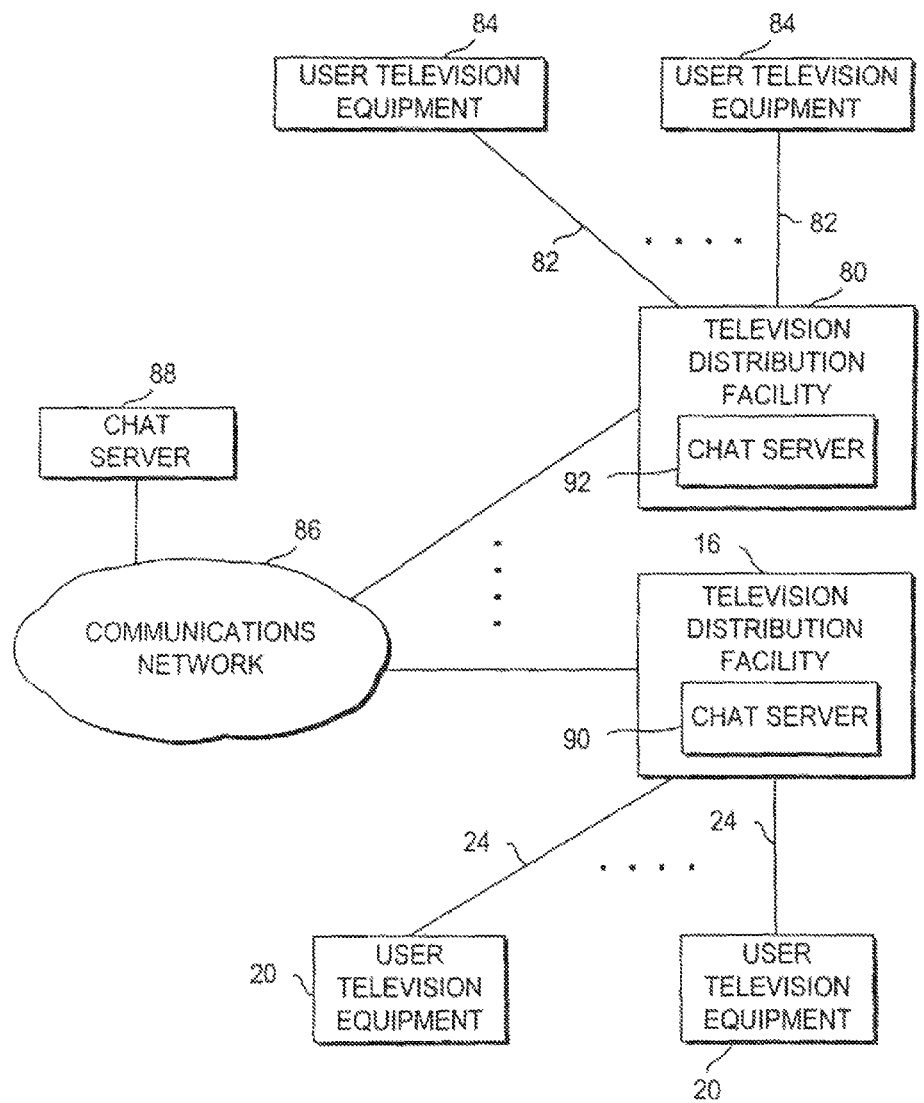
FIG. 2A is a system diagram showing how multiple television distribution facilities may be connected via a communications network in accordance with the present invention.

As shown in FIG. 2A, real-time communications and chat requests can be distributed along communication paths 24 from one user television equipment device 20 associated with a given television distribution facility 16 to another user television equipment device 20 associated with that facility using a chat server located at the facility. For example, the real-time communications and chat requests sent between two or more user television equipment 20 devices associated with television distribution facility 16 of FIG. 2A may be handled by chat server 90 in television distribution facility 16. An advantage to limiting operation of the chat system to individual television distribution facilities is that it allows individual cable system operators (for example) to control their systems and it does not involve coordinating chats between areas or different time zones. If desired, however, real-time communications and chat requests exchanged by user television equipment 20 can be handled by a chat server 88 that is connected to television distribution facility 16 via communications network 86. Communications network 86 may be any suitable communications network such as the Internet, a public or private telephone network, a network involving satellite or wireless links, cable network, etc.

The chat system may also be configured so that users at one or more user television equipment devices 84 may participate in a real-time discussion or exchange chat requests with one or more of user television equipment 20. User television equipment 84 is thus associated with a different television distribution facility than user television equipment 20. User television equipment devices 84 are connected to television distribution facility 80 via communications paths 82. Chat server 92 is used to handle real-time communications and chat requests for user television equipment devices 84. The configuration of server 92 and user television equipment 84 may be based on a client-server arrangement. Television distribution facilities 80 and 16 are connected to each other via communications network 86. Real-time communications and chat requests sent between user television equipment 20 and user television equipment 84 may be handled by chat servers 88, 90, or 92. If desired, numerous television distribution facilities may be connected together via communications network 86 or other such communications networks to allow user television equipment from these television distribution facilities to engage in real-time communications with each other.

Figure 2B:
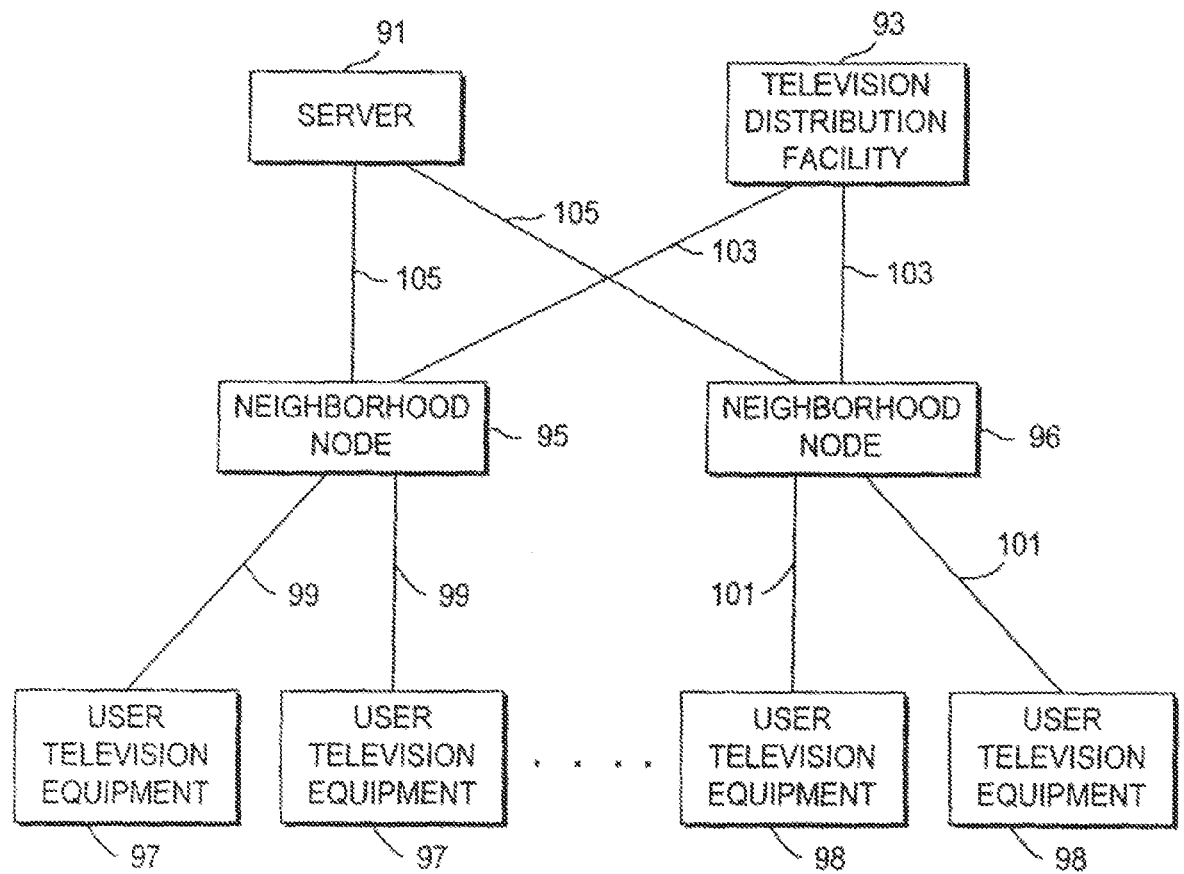
FIG. 2B is a system diagram showing how multiple user television equipment devices may be connected to a television distribution facility and a separate server via neighborhood networks in accordance with the present invention.

Real-time communications and chat requests may be handled on a server that is not located at the television distribution facility as shown in FIG. 2B. For example, real-time communications and chat requests may be transmitted between user television equipment devices 97 and 98 via neighborhood nodes 95 and 96. User television equipment device 97 are connected to neighborhood node 95 via communications path 99, and user television equipment devices 98 are connected to neighborhood node 96 via communications path 101. Neighborhood nodes 95 and 96 decrease the bandwidth requirements on communications paths 103 for a given number of user television equipment devices 97 and 98. Neighborhood nodes 95 and 96 route television programming from television distribution facility 93 to user television equipment 97 and 98. Neighborhood nodes 95 and 96 also route chat requests, real-time communications, chat group information, etc. between server 91 and user television equipment 97 and 98. Neighborhood nodes 95 and 96 may also route requests to perform many of the chat system functions described herein from user television equipment 97 and 98 to server 91. Responses from server 91 are routed back to the appropriate user television equipment device via a neighborhood node.

Figure 3:
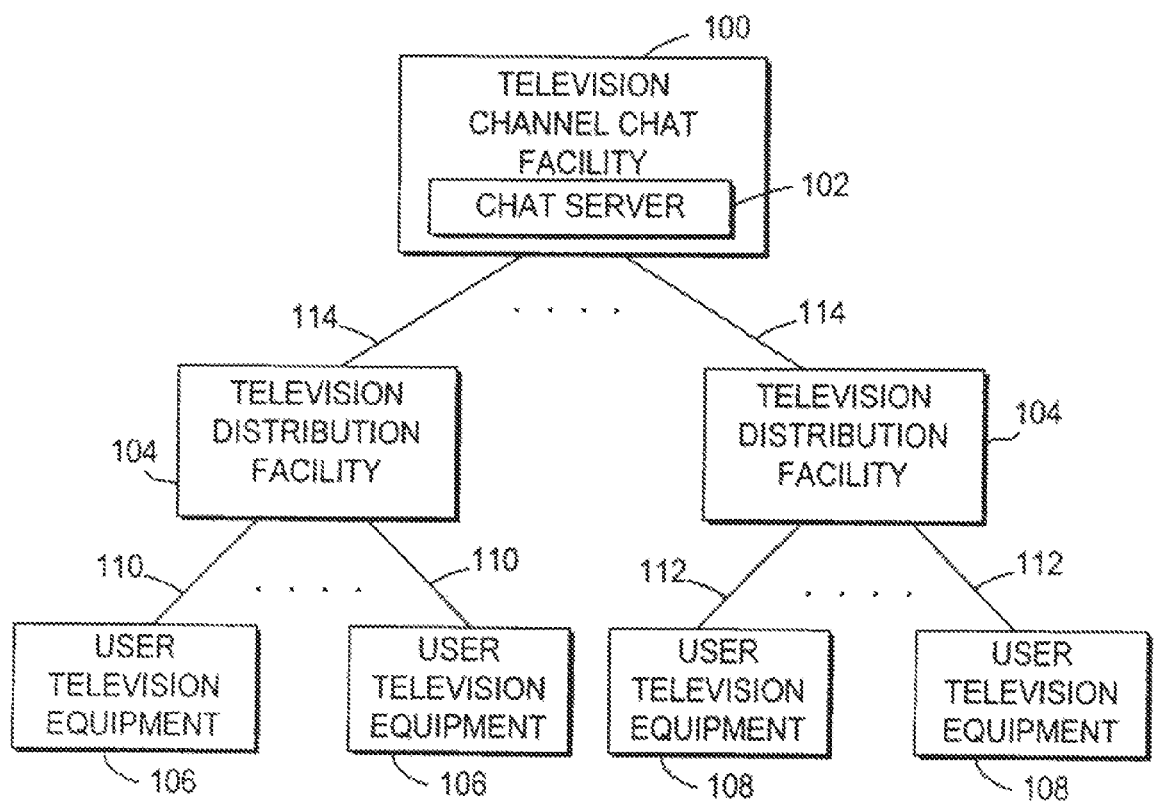
FIG. 3 is a diagram of a system configuration in which multiple television distribution facilities are connected via a television channel chat facility in accordance with the present invention.

As shown in FIG. 3, a television channel chat facility 100 that is associated with a particular television channel may contain a chat server 102 to handle real-time communications and chat requests sent between user television equipment 106, 108, and other such user television equipment. User television equipment devices 106 and 108 are connected via communications paths 110 and 112 to television distribution facilities 104 that are in turn connected to television channel chat facility 100 via communications paths 114.

Figure 4:
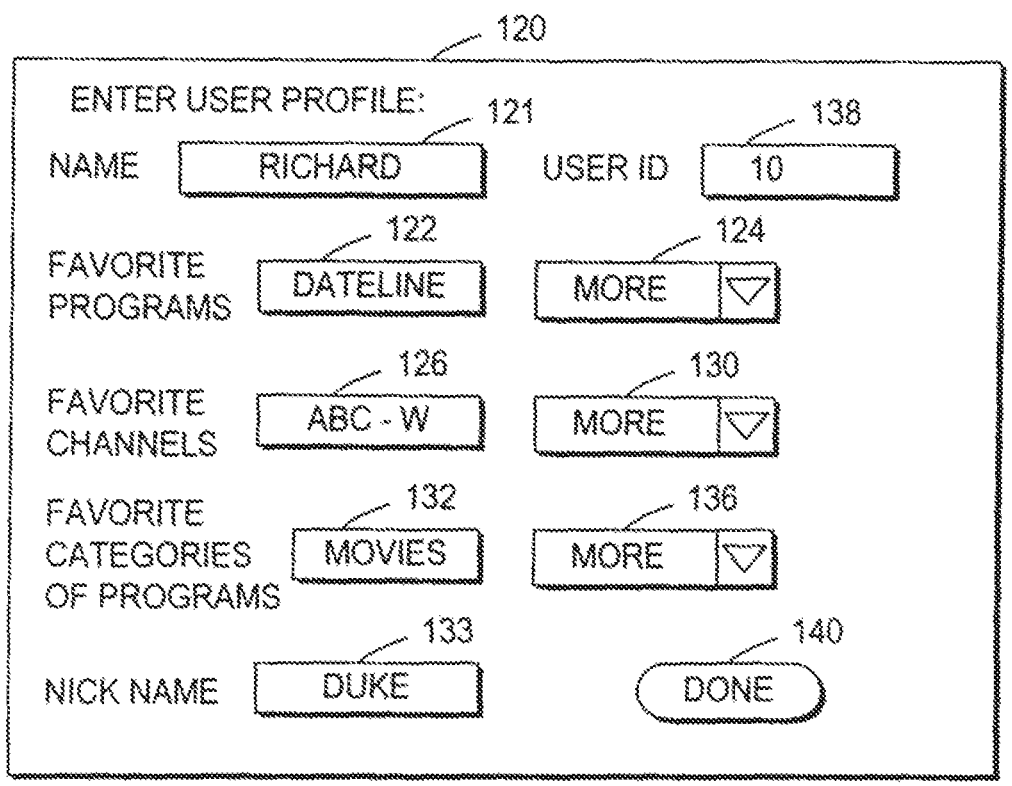
FIG. 4 is a depiction of an illustrative display screen for entering household user profile information in accordance with the present invention.

If desired, the user at a particular user television equipment device may enter profile data that will form the identity of a particular individual. The individual may be the user himself or another member of his household. FIG. 4 illustrates an example of a display screen 120 that may be provided by the interactive television program guide with chat features or the separate chat application to provide the user with an opportunity to enter profile data information about a particular individual within the household. The user profile data may include the user's name, which may be entered in box 121. The user profile data may also include the user's favorite program, which may be entered in box 122 (either directly or by selecting from a menu or other suitable list of programs). The user's favorite programs associated with that user's profile may be the same favorite television programs that are saved in the program guide database, or a subset thereof. If desired, the user profile favorite programs may be different from the favorite television programs in the program guide database. The user may also select option 124 to enter more favorite programs (e.g. by providing more boxes 122).

The user profile screen 120 may also present the user with an option to enter a favorite television channel such as ABC-W in box 126. Television channels include television networks such as ABC, local affiliates, local broadcast stations, pay-per-view channels, cable channels such as HBO and CNN, etc. The user can select option 130, so that additional favorite channels may appear on user profile screen 120. The user profile screen may also present the user with an option to enter favorite categories of programs such as sports programs, movies, news segments, sitcoms, etc. The user has entered "movies" as a favorite category in box 132 of FIG. 4. The user can select option 136 so that additional categories may be entered on user profile screen 120. If desired, the program guide (or the stand-alone chat application) may present the user with an optional unique user identification code (displayed in box 138), to help the system distinguish the user from other user's at the same user television equipment device when receiving a real-time communication or chat request from the outside. In this way real-time communications and chat requests can be directed to specific users. The user may also enter a nickname for himself in box 133. A nickname may used for anonymity in a chat group or as a creative pseudonym related to the chat topic. Alternatively, screen 120 may provide the user with an opportunity to enter a icon that identifies the user in the chat room rather than a nickname.

The user may select DONE option 140 when he has finished entering his profile data or may press a remote control key (e.g., the EXIT key). Once a user has entered profile data, the data is stored for later retrieval. User profile data may be stored in the set-top box, at a server as described above, or elsewhere in user television equipment 20 such as a separate storage unit connected to the set-top box. Further features of an illustrative system for entering user profile information are described in Ellis et al. U.S. patent application Ser. No. 09/034,934 filed Mar. 4, 1998, which is hereby incorporated by reference herein in its entirety.

When the user is watching television, the program guide with chat features or the stand-alone chat application (hereinafter collectively referred to as the set-top box application) allows the user to identify himself or herself by selecting one of the user profile identities that were previously entered or by adding a new user profile identity. Display screen 150 in FIG. 5 is an illustrative display screen that may be used to show all of the household members for whom user identities have been established using the set-top box application.

Figure 5:
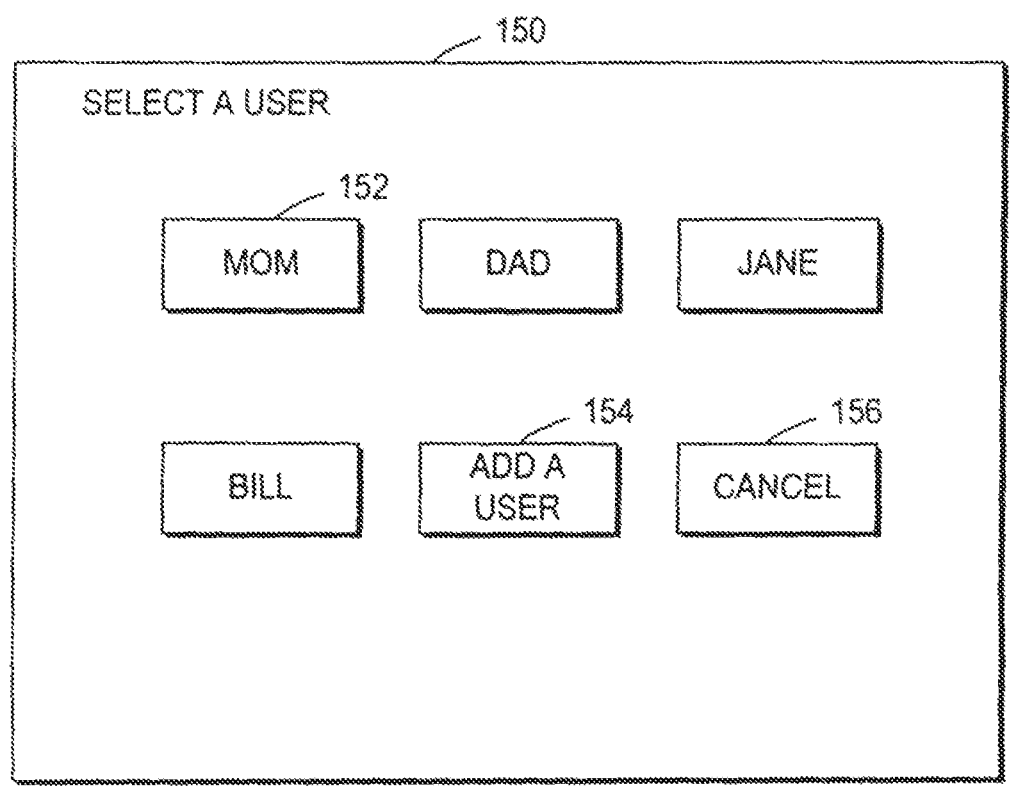
FIG. 5 is a depiction of an illustrative display screen that allows a user to select a user profile in accordance with the present invention.

The set-top box application may provide a display screen such as display screen 150 of FIG. 5 whenever the user turns on the set-top box 26 or whenever the user has indicated a desire to identify himself or herself. For example, if Mom is watching television, she will select box 152. The set-top box will then access Mom's profile data. If desired, user identities may be placed under password control. If a new member of the household is watching television, that user may click on box 154 to add a new user profile identity. The set-top box application will then provide display screen 120 (FIG. 4), so that the user can enter his profile data. If the user does not wish to identify himself or does not wish to enter a new user profile, the user can select cancel option 156 to cancel the display of display screen 150. If the set-top box application includes a program guide, the user profiles may be used for both chat-related functions and program guide functions.

The program guide may also present the user with the option of entering identity data that relates to users of other user television equipment. Users of other user television equipment may be recipients of real-time communications or chat requests sent by a household user. These recipients of real-time communications or chat requests are referred to as non-household users. Non-household users may send real-time communications and chat requests that are received by a household user.

Figure 6:
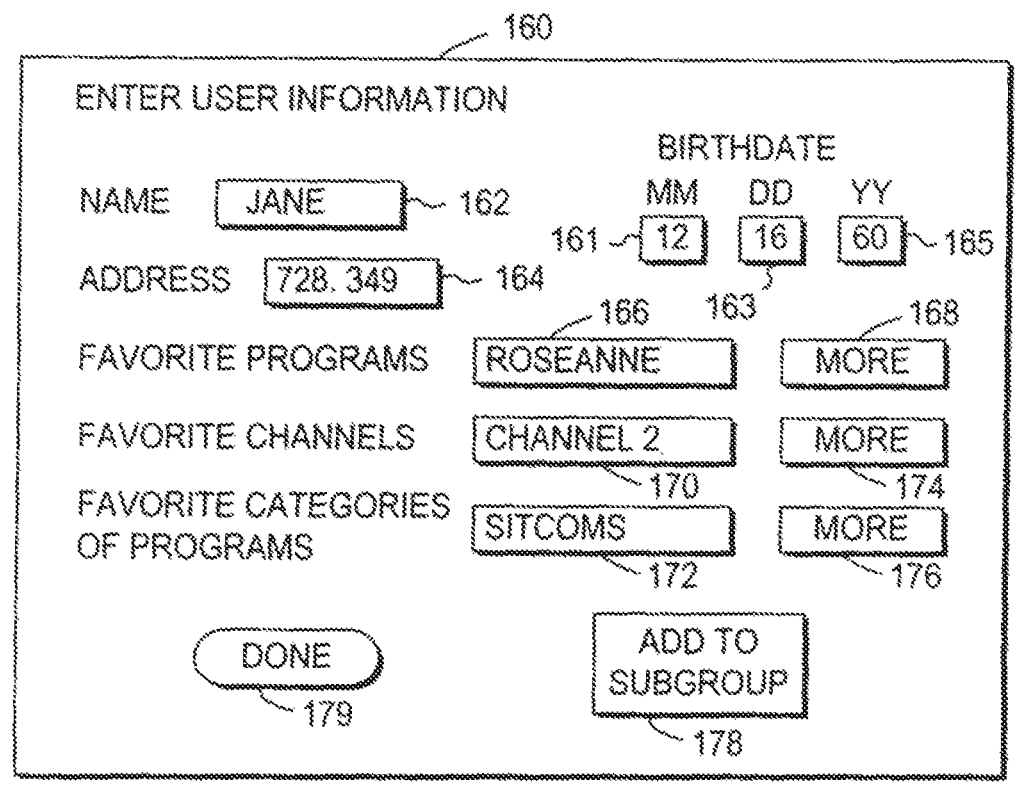

FIG. 6 illustrates a display screen 160 that the set-top box application may present on a user's television when the user indicates a desire to enter identity data relating to a non-household user. The non-household user's name may be entered in box 162 and the non-household user's address may be entered in box 164. A user's address is a unique identifier assigned to a particular user which allows a chat server to transmit real-time communications and chat requests to the proper recipient.

A household user may enter a non-household user's favorite programs, channels, and categories of programs in television display screen 160. A household user may determine a non-household user's preferences by chatting with that person in a chat group. The non-household user's favorite programs may be entered in box 166, and additional empty boxes for entering more favorite programs will be displayed on television display screen 160 if the user selects more option 168. The non-household user's favorite channels may be entered in box 170 such as channel 2. The user can select option 174 so that additional channels may be entered on the television display screen 160. The non-household user's favorite categories of programs such as sports programs, movies, news segments, sitcoms, etc. may also be entered in television display screen 160. The user can enter a favorite category of programs such as sports in box 172. The user can select more option 176 so that additional categories of programs may be entered. The non-household user preference information entered in display screen 160 may be useful for sending chat requests to other users who may be interested in chatting about the same programs, channels, or categories of programs as the household user.

The user may also enter user information not related to television programming such as a non-household user's birth date, city and state of residence, favorite actor, favorite hobbies, etc. In screen 160, the user may enter the non-household user's birth date in regions 161, 163, and 165. The user can select option 178 to indicate that the non-household user's information is to be added to a currently existing or new subgroup of identities. The subgroup of identities will appear as a group of identities on an address book screen (such as Members of Hiking Club in display screen 180 of FIG. 7). If desired, the set-top box application may automatically group individuals together as groups in the address book based upon their viewing preferences. The user may select Done option 179 when he has finished entering the non-household user's information. The non-household user's data may be stored in the set-top box, at a server, or elsewhere in user television equipment 20 such as a separate storage unit connected to the set-top box. Furthermore, it should be understood that a chat system user profile such as the ones described above could incorporate information from a household and a non-household user into one identity (e.g. a husband-wife couple).

In addition, the chat system may be configured similar to the ICQ system so that a user may make his profile information public so that it can be accessed by other users. ICQ is an Internet tool that informs Internet user's who is on-line at any time and enables users to contact them at will. ICQ can search for an individuals on-line and alert a user when they log on. ICQ allows a user to chat, send messages, files, URL's, play games, or just hang out with fellow Internet users while surfing the Internet.

A user may fill out a questionnaire through the chat system which includes information regarding the user's television program preferences as well as additional non-television related information about himself such as his hobbies (e.g. using display screen 120). The user profile information may be useful for forming chat groups between users. The user profile information may be stored at a remote server or jointly on the set-top boxes. A user may access profiles which have been made public and form a "buddy list" or address book of other users who have the same interests. The buddy list can include a user's identity, TV preferences, and other interests.

The chat system may be set up so that a user must obtain permission from a second user before he is able to add the second user to his buddy list. For example, the chat system may send the second user a message indicating the first user has requested the second user's profile information. If the second user accepts the request, the chat system allows the first user to add the second user to his buddy list so that he can have access to the second user's profile information and can initiate chat sessions with that user. In addition, the chat system may ask the second user if he wishes to add the first user to his buddy list. A user may add further information to the profile based on his knowledge of the other user's preferences (e.g. through display screen 160). The chat system may also allow users to search for chat buddies based on a user ID number, an e-mail address, TV program preferences, and/or other preferences.

Figure 7:
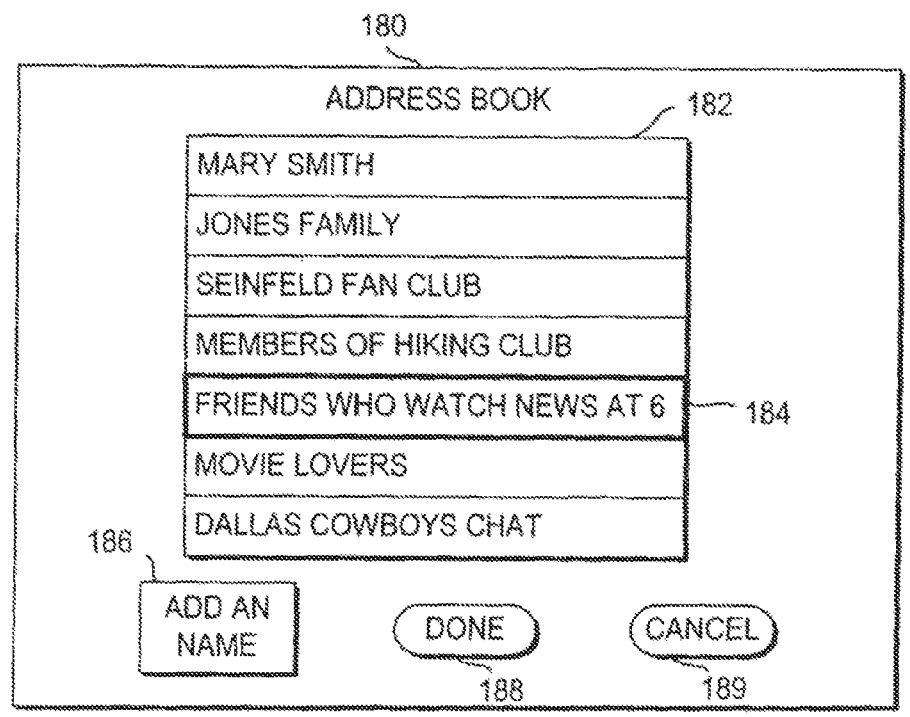
FIG. 7 is a depiction of an illustrative program guide address book for non-household users in accordance with the present invention.

The identities of non-household users whose names, addresses, and other corresponding information have been entered may be displayed by the set-top box application in an address book format on the user's television screen. An example of an address book display screen 180 is shown in FIG. 7. Address book display screen 180 displays a list of identities 182 of non-household users or subgroups of non-household users. The non-household users can be individuals such as Mary Smith, or groups of individuals such as the Jones Family as illustrated by the names in the list 182. An individual user may be part of more than one group in the address book. For example, Mary Smith may appear in the address book as an individual, and be a member of the groups "Seinfeld Fan Club" and "Movie Lovers."

The user may send a chat request by selecting an identity or identities in the list. The list may contain groups of individuals who are interested in a particular program, type of program, chat group, or any other group identified by the user such as "Jones Family," "Members of Hiking Club," "Seinfeld Fan Club," "Movie Lovers," or "Dallas Cowboys Chat." The groups need not be TV-related. If desired, the set-top box application may present a pop-up option on the television screen to send a chat request to the individuals in a list in the address book when the user is watching a related television program (e.g. Seinfeld).

Option 184 is highlighted to indicate that the user has chosen Friends Who Watch the News at 6. This may be a group of the user's friends who enjoy watching the program "News at 6" and who may wish to engage in a chat group with the user. The user may choose as many recipients of the chat request as he desires by selecting names from the list. The user may choose to enter additional identities of non-household users by selecting option 186, which will take the user to television display screen 160 of FIG. 6. When the user has selected the recipients of the chat request, the user may select DONE option 188. The set-top box application will then retrieve the address for each recipient of the chat request and deliver the chat request to each of the recipients. The user may select cancel option 189 to exit from address book display screen 180.

Figure 8:
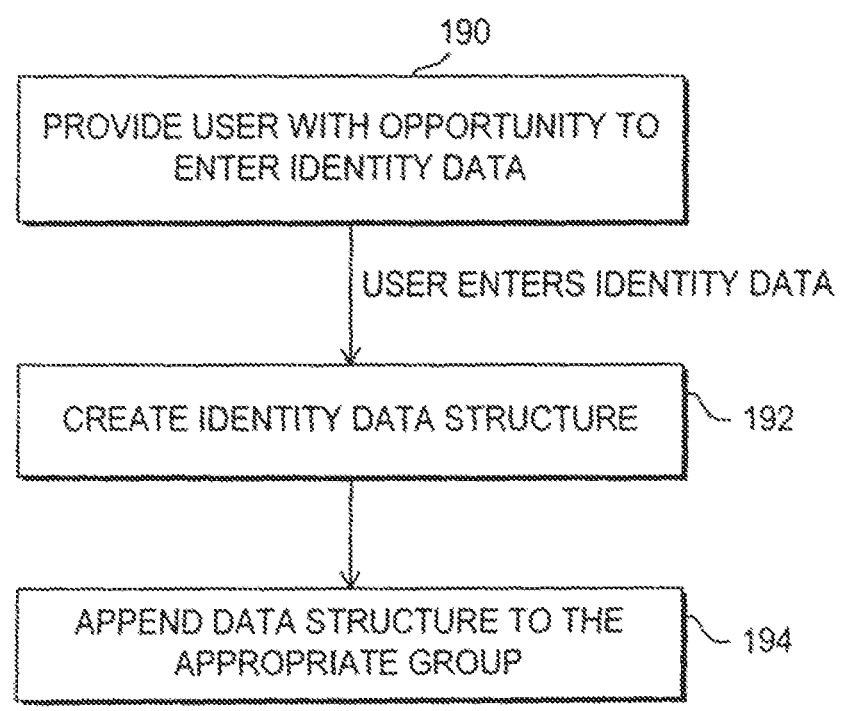
FIG. 8 is a flow chart showing the steps involved in creating user identities in accordance with the present invention.

An illustrative process for creating the identities for household users and non-household users that have been discussed with respect to FIGS. 4, 5, 6 and 7 is shown in FIG. 8. At step 190, the set-top box application (i.e., the program guide with chat functions or the stand-alone chat application) provides the user with an opportunity to enter identity data with respect to a household user or a non-household user by displaying, for example, television user interface screens 120 or 160 respectively. The user then enters the data that is called for by the television user interface screen. Once the user has finished, the set-top box application will create an identity data structure at step 192 that contains the information that was entered for that particular household user or non-household user. The set-top box application will then append the data structure to the appropriate group at step 194. The group to which the data structure is appended may be a group of users of the household, the address book of non-household users, or a subgroup of non-household users within the address book. Steps 190, 192, and 194 of FIG. 8 may be performed by the set-top box application implemented on the user television equipment, but may also be at least partially implemented by a chat server using client-server architecture. For example, the data entered into screens 120 and 160 may be sent by the set-top box to the server for processing.

A user may use the set-top box application to send and receive real-time communications to and from other users within a forum called a chat group. All of the users who are participants of the chat group can send and receive real-time communications from all of the other participants. The real-time communications in the chat group may be messages or other communications that are text, audio, video, or HTML. A user may enter a URL for a web page, for example, as part of a chat message in a chat group using HTML so that other users in the chat group can link to that web page easily. Text has the advantage of low bandwidth requirements. Audio may be desirable for users who like the immediacy of voice communications, but may not be desirable for users who prefer the anonymity of text. Video is similar to audio in this respect. The choice of whether to support text, audio, or video in a particular chat system depends on a variety of factors such as these. In addition, a chat group may be set up as a mixed media chat so that it accepts text, audio, video, and HTML input from different users. For example, a chat group with three users may have one user inputting audio communications, another inputting textual and HTML communications, and another inputting video communications. The real-time communications in a mixed media chat may be received in the form that they are sent or converted into another form (e.g. text converted to audio for a blind person). Aspects of the present invention are applicable to all of these configurations, although for clarity, the invention is described primarily in connection with text-based chats.

Real-time communications are transmitted over the communications paths shown and described in connection with FIGS. 2A, 2B, and 3. A chat group in which written real-time messages are typed in by participants and transmitted in the form of text messages to all of the other participants of the chat group is called a chat room.

Figure 9:
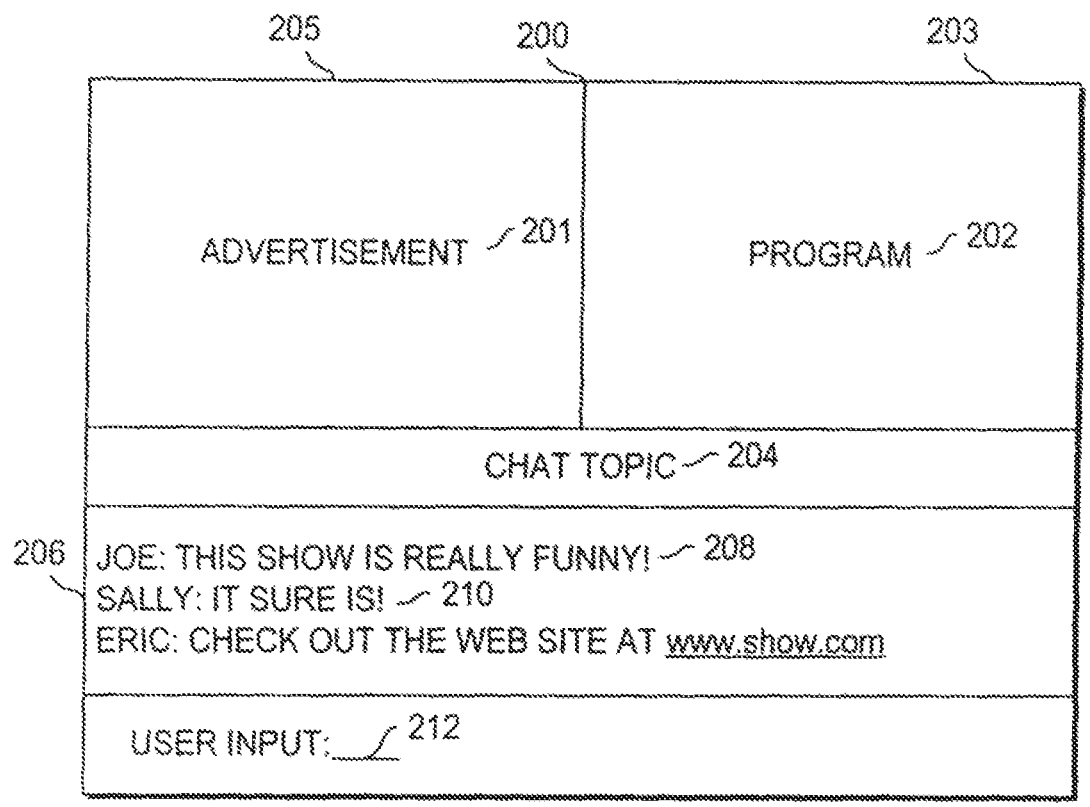
FIG. 9 is a depiction of an illustrative display screen containing video for a television program and a chat group display region related to the program in accordance with the present invention.

FIG. 9 is an example of how real-time communications may be displayed by the set-top box application in the form of textual messages in a chat room. Television program 202 may be displayed in region 203 of display screen 200, while a chat room region 206 may be displayed simultaneously in the lower portion of display screen 200. Advertisement 201 may also be simultaneously displayed in region 205 of display screen 200. Advertisements may accompany any of the display screens or user interface screens of the present invention. This arrangement is merely illustrative. Any suitable arrangement may be used to display chat messages and television programming simultaneously. For example, chat room region 206 may be displayed as an opaque or translucent overlay of television program 202. Participants in the chat room send chat messages which appear in region 206. A chat participant may send an HTML chat message such as a URL for a web site.

In display screen 200, the chat topic 204 may be related to the television program 202 as can be seen by the content of messages 208 and 210. The user can enter messages using keyboard 34 (FIG. 1B) before they are displayed in the chat room at cursor 212. The user's chat message may be sent to the chat server when the user hits a Send button or other suitable buttons on a remote control or keyboard. If desired, the chat system may be configured such that characters are sent to the other participants in the chat group one by one as the user types them in. With this functionality, mistakes the user makes may be seen by the other users in the chat group. If desired, the set-top box application may permit the user to send real-time communications to a chat room using an interactive television display screen such as keyboard screen 50 (FIG. 1C) or display screen 75 (FIG. 1D).

The chat system may be configured so that a user can append another user in a chat group to his buddy list or address book by selecting that user's nickname (or icon) in the chat group. For example, the set-top box application may recognize a command such as "add Sally" as indicating that the user wishes to add Sally to his buddy list. The chat system may require the first user to get permission from the second user before the first user can add the second user to his buddy list.

In addition, the chat system may be configured to allow a user to block chat messages from specific users in a chat group that he does not want to communicate with. For example, the set-top box application may recognize a command from the user typed adjacent to cursor 212 such as "block Joe" as indicating that the user wishes to block out Joe's chat messages from now on. The user can type in a command such as "unblock Joe" to start receiving Joe's chat messages again. Other protection features may be built into the chat system to protect children from obscenity. For example, the chat system may be configured to block out certain vulgar words in chat groups. As another example, parents may be permitted to block out certain offensive chat groups so that their children cannot enter them.

The divided nature of screen 200 allows users to simultaneously watch a television program and send real-time communications to other users who are viewing the same program at the same time. In this way, chat room 206 is directly linked to the on-going actions in program 202 in that a user can send and receive comments about the content of the program as it unfolds on his television screen. A chat room may terminate at the end of the program or may continue beyond the end of the program until all of the users have exited the chat room.

Real-time communications can be stored on a chat server (e.g. located at a television distribution facility). The communications paths illustrated in FIGS. 2A, 2B, and 3 may be used to route real-time communications to user television equipment connected to different television distribution facilities. The real-time communication system of the present invention therefore allows real-time communications to be transmitted between users of user television equipment that are connected via numerous television distribution facilities such as the network in FIG. 2A.

If desired, a simpler system configuration may be used in which all chat participants are linked to a common chat server and a single associated television distribution facility. While this arrangement is more limited than the more interconnected arrangements involving multiple television distribution facilities, it has the advantage of being easier to implement because there is only a single time zone and potential participants all have access to the same programming. A chat group maintained by a chat server associated with a particular television distribution facility may also be restricted to users connected to that particular television distribution facility in order to limit the size of the chat group. If desired, a chat group can be limited to those television distribution facilities that broadcast to users in a particular time zone to ensure that all of the users who participate in the chat group can watch the television program that is the topic of the chat group at the same time. In addition, a chat group may be limited to television distribution facilities that broadcast only to users in a particular local area. This may be desirable, for example, if the subject of the chat group is a local news segment or a local television channel.

In another possible configuration, a chat session may be recorded while a TV program is broadcast in one time zone and played back while the program is broadcast at a later time in another time zone. This allows users in the later time zone to see comments previously entered by the users in the other time zone while comments from users in the current time zone are entered. Chat messages from the second time zone may be recorded also and played back in a third time zone at a later time along with the chat messages from the first time zone. However, users may not communicate in real time with users from other time zones using this system unless the program is broadcasted at the same time in multiple time zones, or users participate in the chat group before and/or after the program broadcasts in their area.

Another aspect of the present invention relates to using the set-top box application to support real-time audio communications. Real-time audio communications can be linked to a particular television program. For example, a television talk show may have a live question and answer session with various users who are watching the talk show. Users can be given the opportunity to join an audio chat group. A select group of users can then be joined in the audio chat group. Participants of the audio chat group will be given the opportunity to ask questions or to voice comments about various issues discussed during the talk show. Participants of the audio chat may also be permitted to send in questions in the form of text and receive responses in the form of text as in a chat room. Certain questions from the user participants of the chat may be discussed live on the TV program. Participants of the audio chat may also send in live video images (e.g. of themselves) as in video chat, which is discussed further below). A video image of a user participant may be played live on the TV program while that user's question or comment is being discussed on the TV program.

Figure 10:
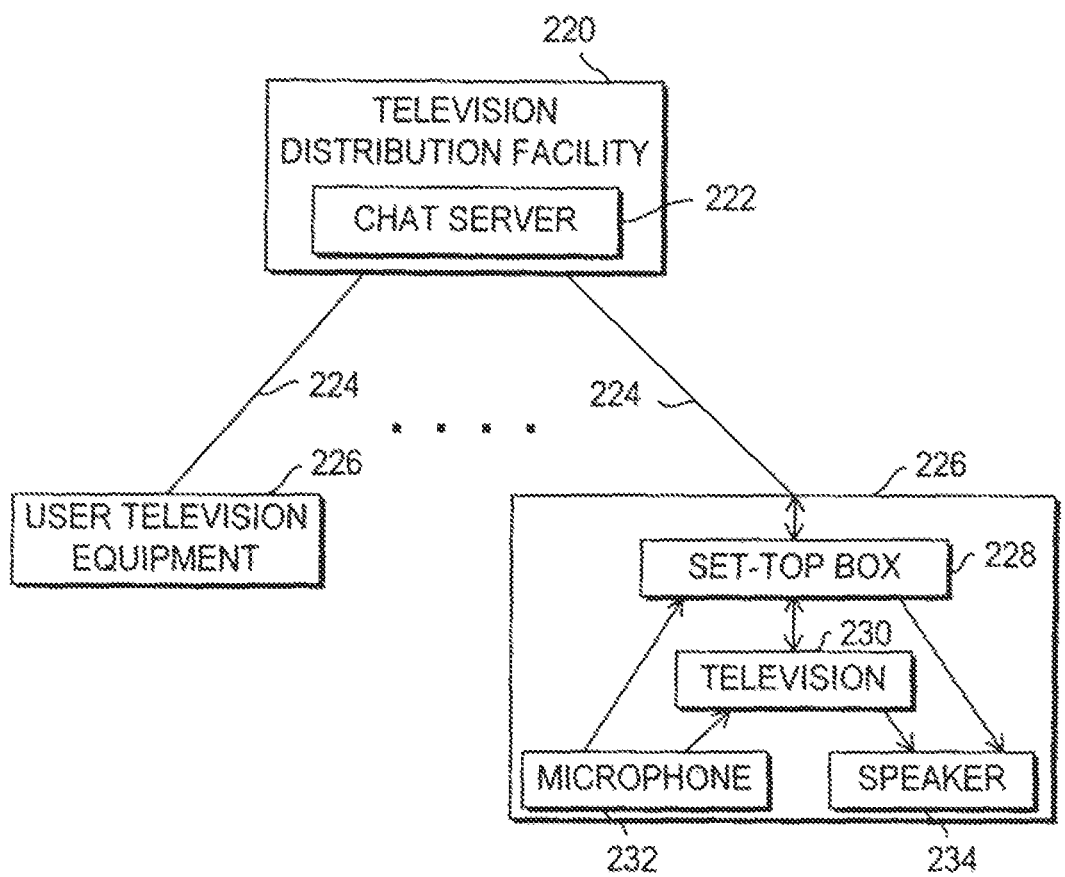
FIG. 10 is a diagram of an illustrative system for the transmission of real-time audio chat communications to user television equipment in accordance with the present invention.

FIG. 10 illustrates an example of an audio chat system in which real-time audio communications may be transmitted between different user television equipment devices 226 via television distribution facility 220. User television equipment devices 226 are connected to television distribution facility 220 via communications paths 224. Real-time audio communications are transmitted over communications paths 224 and processed by chat server 222 or suitable audio conferencing equipment. Chat server 222 may be located at television distribution facility 220 as shown in FIG. 10 or it may be separate from TDF 220. The audio chat system may be configured to cancel out audio from the current TV program in the send user's audio chat messages so that the recipient user does not hear the TV program audio along with the sender's audio messages. This procedure may be performed at the microphone end using signal subtraction whereby the microphone input is compared with the TV program audio and only the user's input is passed to the chat server.

Real-time audio communications may also be transmitted between user television equipment devices connected to different television distribution facilities using communications networks such as the ones shown in FIGS. 2A, 2B, and 3. Real-time audio communications may be transmitted from user television equipment devices 226 to a television channel chat facility along a communications network such as the one shown in FIG. 3, so that an audio chat facilitator (moderator) or television personality can participate in the chat group. The facilitator can determine who in the chat group may speak at a given point in time. A text-based or video chat may also have a facilitator, although this is less desirable for a text-based chat group with a small number of participants. If desired, a chat group may be configured such that the participants are only allowed to send a chat message when it is that person's turn. The determination of who is allowed to send a chat message at any given time may be determined automatically.

The television distribution facility may provide telephone service over the same communication lines that provides television service. This type of television distribution facility is called a central office (CO) for a telephone system. Audio chat may be set up using the telephone facilities of that system. This would take advantage of the telephone infrastructure that many cable systems build over a broad band cable network. The television channels and phone service can be transmitted along the same cable line, although the information in each path would be logically separable.

Each user television equipment device 226 in FIG. 10 contains a set-top box 228 that receives real-time audio communications from chat server 222 and a television 230 for viewing programs. Real-time audio communications can be sent by a user by speaking into microphone 232. The user's voice is converted into a signal that may be received by set-top box 228. Set-top box 228 transmits the user's voice signal to chat server 222. Chat server 222 or other suitable equipment such as an audio bridge (i.e., audio conferencing equipment) distributes the user's voice signal to other users who are participants of the same audio chat group. Real-time communications may then be heard by a user on speaker 234 which is connected to television 230 or set-top box 228 or is a part of television 230.

The real-time audio communications system of the present invention allows users who are watching a particular television program to talk to each other while watching the program. It also may allow users to talk with a chat facilitator located at a television channel chat facility or a television distribution facility. It also may allow users to talk with a television show personality while the personality is appearing on the television program. In these later two instances, audio chat communications would involve connecting the user to the television channel chat facility or distribution facility where the chat facilitator or television show personality is located along communications paths such as the ones shown in FIGS. 2A, 2B, and 3.

Figure 11:
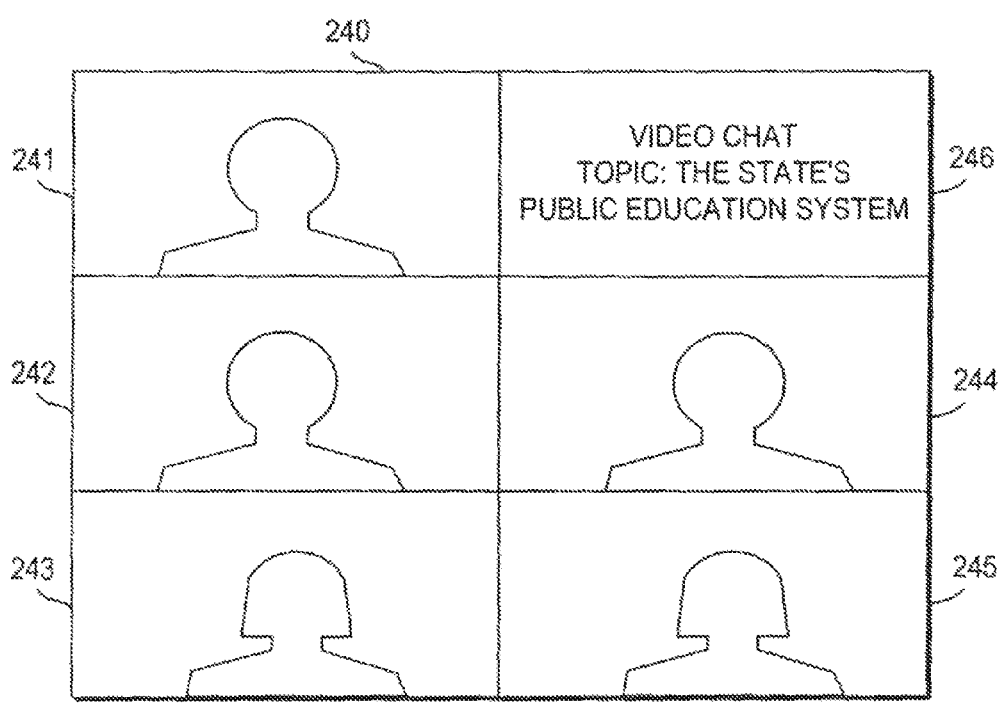
FIG. 11 is an illustrative television display screen displaying video images of the participants in a chat group in accordance with the present invention.

Video chat images can also be transmitted as real-time communications by the chat system if desired. The video chat images may include audio or may be silent (e.g., if the participants use sign language or body language or if there is accompanying chat text). Video may also include accompanying textual communications. FIG. 11 illustrates an example of how live video images of various users in a chat group can be displayed on display screen 240 in display regions 241-245. The video chat topic may be shown in display region 246. This feature of the present invention allows users to see images of other users that they are speaking to in the chat group. If desired, the user may view video images of participants in multiple chat groups. For example, display regions 241, 242 and 243 may contain video images of the participants of one chat group while display regions 244 and 245 may contain video images of the participants of another chat group. The set-top box application may provide the user with an opportunity to select which chat group he wishes to receive communications from. This allows the user to watch video images from more than one chat group while listening to a television program or the real-time audio communications of one of the chat groups as the user desires.

Participants in a video chat may communicate with each other in real-time through visual images and signals. For example, users have the advantage of being able to see the reactions of others users to comments made during a chat by observing their facial expressions and body language. A video image of a chat facilitator or a television show personality may be provided in one of display regions 241-245. If desired, a television program may be displayed in one of display regions 241-245. With this type of arrangement, the chat group topic may be related to the action in the television program or an issue discussed in the television program.

Figure 12:
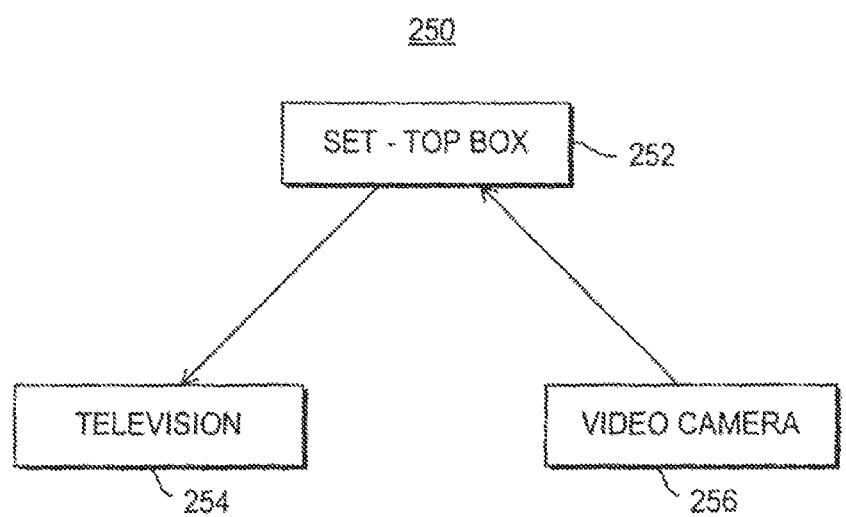
FIG. 12 is a diagram of an illustrative system for the transmission of video chat images in accordance with the present invention.

FIG. 12 is an example of user television equipment 250 for implementing the video images feature of the present invention. Signals containing video images from other users participating in a chat group may be received by set-top box 252 from chat equipment (e.g. a video bridge). The set-top box application displays the images on television 254. The signals may contain audio communications. Each user's image may be obtained using a video camera such as video camera 256 connected to set-top box 252. The set-top box application may transmit the signal containing the user's image to chat equipment associated with the user television equipment for redistribution to other participants of the chat group via communications networks such as the ones shown in FIGS. 2A, 2B, and 3.

A user may obtain and transmit video images of any person or object for transmission to the other participants in a chat group. A user may communicate through video images. For example, a user can display written messages in front of video camera 256 that may be read by other users on their television screens. A single chat group could be audio, video, text, HTML, or other any other means of communication.

The chat equipment coordinating the video or audio chat may implement the transmittal of messages between users using one of the currently available technologies for handling video or audio conferencing. For example, a chat system may be implemented by a chat server to continuously route the real-time communications from the participants in a chat group to the other participants in the chat group. If desired, the originator of a message such as a text message may be presented with all the messages from every participant in the chat group, including his own message. With respect to audio chat, there is generally no need to redistribute a message back to its originator because a user does not want to listen to his own voice repeated back to him. Therefore, an audio chat system may ensure that the sender of a real-time communication does not receive his own communication. In video chat, the chat system may be configured, for example, to only display on the television screen the image of the person who is currently speaking.

The chat system can join a user to a chat group when the user has indicated a desire to join a particular chat group. The user's desires can be determined, for example, through a display screen provided by the set-top box application such as display screen 270 of FIG. 13. Television program 271 is overlaid by interface region 274 so that only upper portion 272 of program 271 is visible. User interface region 274 provides the user with an opportunity to indicate a desire to join a chat group by selecting YES option 276. User interface screen 274 also allows the user to not join a chat group by selecting NO option 278. If NO option 278 is selected, user interface screen 274 disappears. User interface screen 274 can be displayed automatically by the set-top box application whenever a chat group related to the television program that the user is viewing is available or becomes available, or could be displayed based on a reminder set earlier by the user. Advertisement 275 may also be displayed in interface screen 274. If desired, user interface screen 274 can be displayed when the user selects a chat option from a program guide display screen or presses a dedicated chat button on a remote control or uses any other user interface to indicate a desire to join a chat. Alternatively, this screen could be skipped and the user could proceed directly to the chat group if the user has selected a chat option. The chat group may continue beyond the end of program 271.

Figure 14:
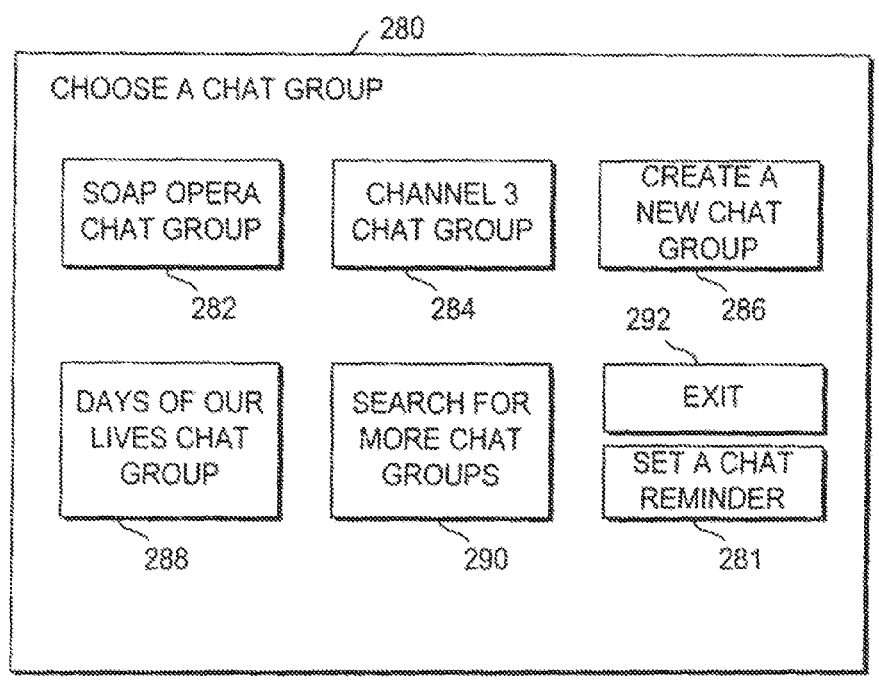
FIG. 14 is a depiction of an illustrative display screen that allows a user to choose a chat group option in accordance with the present invention.

Referring now to FIG. 14, the set-top box application may provide the user with an opportunity to join one or more chat groups of the user's choice. The chat groups options that are provided to the user by the set-top box application may be chat groups that are related to a particular television program or channel that the user is tuned to when the chat group options are initially displayed.

Information regarding real-time communications such as listings of chat groups that are available for a particular television program or channel may be provided to the set-top box application using any suitable data distribution technique. For example, information on scheduled chat groups may be obtained on-demand by the set-top box from a server or with the program guide listings from the main facility. If desired, information on available chat groups may be encoded digitally in-band with the television program signal on a digital channel. The chat information may be decoded by a digital set-top box along with the TV program signal. As another example, information on which chat groups are supported may be maintained at a television distribution facility and distributed to set-top box applications over the vertical blanking interval (VBI) of a standard analog television signal. A VBI decoder located in the set-top box may be used to decode data contained in the VBI of the received television signal.

The decoded data may then be used by the set-top box application to determine whether there are any chat groups available for a program or channel based on the received data. If desired, information regarding real-time communications such as available chat groups may be provided using an out-of-band data path. Such information may also be provided as a digital data stream that accompanies other streams of digital data (such as digital data for various television programs).

Display screen 280 is an example of an options screen that the set-top box application may display to provide the user with an opportunity to join various chat groups related to a program or channel that is being viewed. If the user is watching the soap opera Days of Our Lives on channel 3, the user may be given an opportunity to join a Soap Opera Chat Group by selecting option 282, the Channel 3 Chat Group by selecting option 284, or the Days of Our Lives Chat Group by selecting option 288. The user may join multiple chat groups. Multiple chat groups may be selected with a remote control or wireless keyboard. The chat system may join the user to all of the selected chat groups. The user may also be provided with an opportunity to create a new chat group by selecting option 286. The user may search for more chat groups by selecting option 290. The user may set a reminder for himself to participate in a scheduled chat group by selecting option 281. If option 281 is chosen, the chat system may set a reminder for a previously selected chat group, or provide the user with a list of chat groups to choose from. If the user does not wish to join a chat group, the user may select exit option 292, which directs the set-top box to exit display screen 280.

Figure 15A:
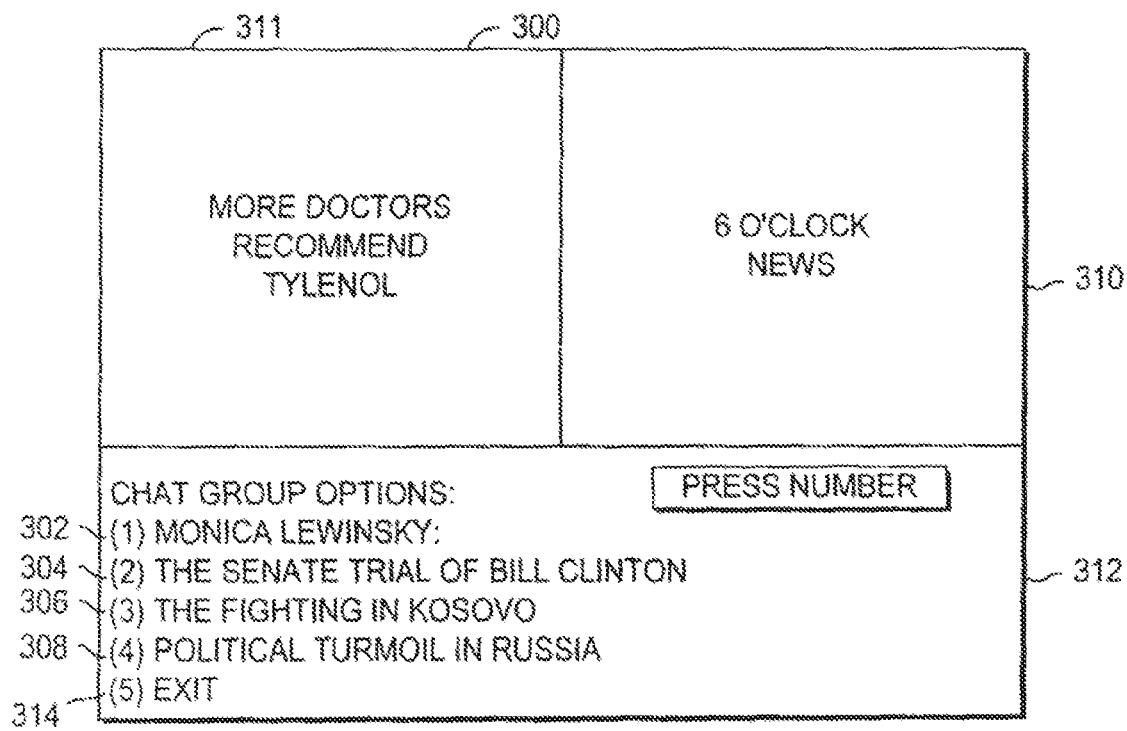
FIG. 15A is a depiction of an illustrative display screen for allowing a user to choose a chat group option related to the current television program in accordance with the present invention.

Another example of a way in which the user may be presented with an opportunity to join various chat groups that are related to a particular television program is shown in FIG. 15A. A reduced-size version of a television program such as the 6 o'clock News is displayed in portion 310 of display screen 300 simultaneously with a user interface region 312 in the lower portion of display screen 300. Also, advertisement 311 may be displayed in screen 300 along with user interface 312. User interface region 312 may allow the user to join chat groups relating to the news segments reported on the 6 o'clock News. The user can join any one or more of chat groups (1), (2), (3) and (4) (corresponding to options 302, 304, 306, and 308 respectively) by pressing the appropriate number on his remote control. If the user does not wish to enter a chat group, he can press (5) (corresponding to Exit option 314) to exit display screen 300 and return to a program guide menu or a full display screen of the 6 O'clock News. Display screen 300 may be displayed by the set-top box application at the user's request or automatically at an appropriate time during the television program. The chat groups may continue beyond the end of the program to allow the participants to discuss follow up issues. The chat group terminates when all of the participants have exited.

Figure 15B:
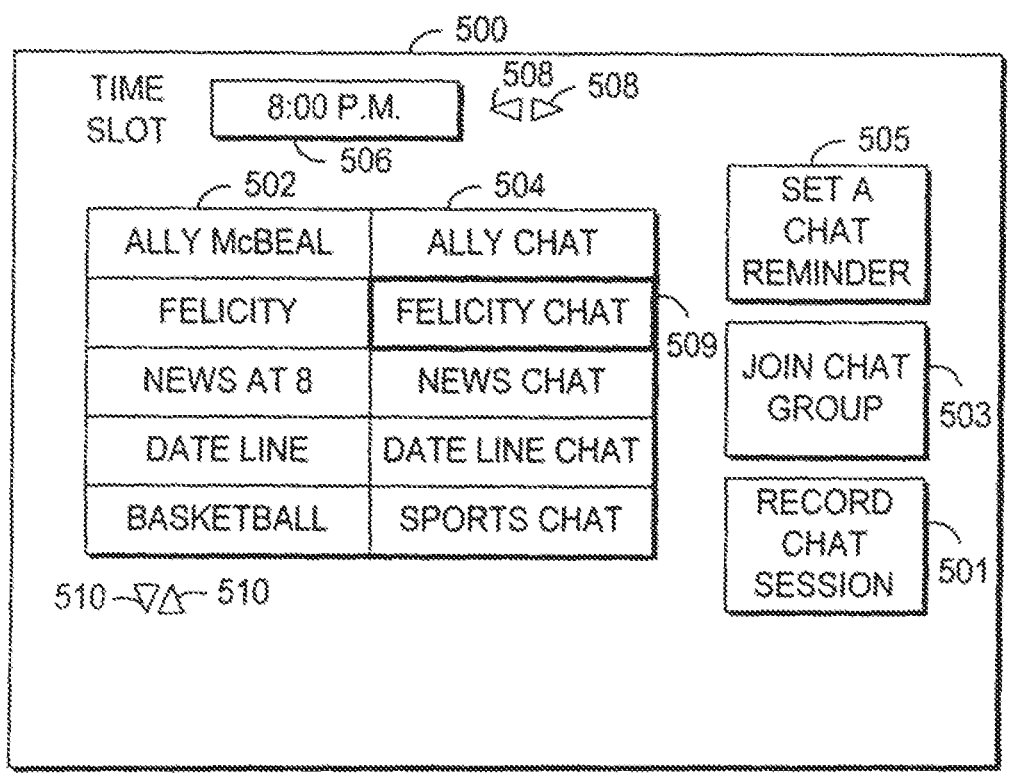
FIG. 15B is a depiction of an illustrative interactive television program guide display screen for allowing a user to select a scheduled chat group from a list to join, record, or set a reminder for in accordance with the present invention.

Television display screen 500 of FIG. 15B is a interactive television program guide display screen which provides a user with an opportunity to view a schedule of upcoming chat groups related to TV programs listed in the program guide. The user can scroll to the appropriate time slot 506 by manipulating arrows options 508. The TV programs are displayed in column 502 and the corresponding chat groups are displayed in column 504. A user may select a chat group by placing highlight region 509 on a chat group. The user may then set a reminder to participate in the chat selected group by selecting option 505. The user may join the selected chat group by selecting option 503. The user may also record a chat session of the selected chat group by selecting option 501. The user may view additional programs and chat groups by manipulating arrows 510.

Figure 16:
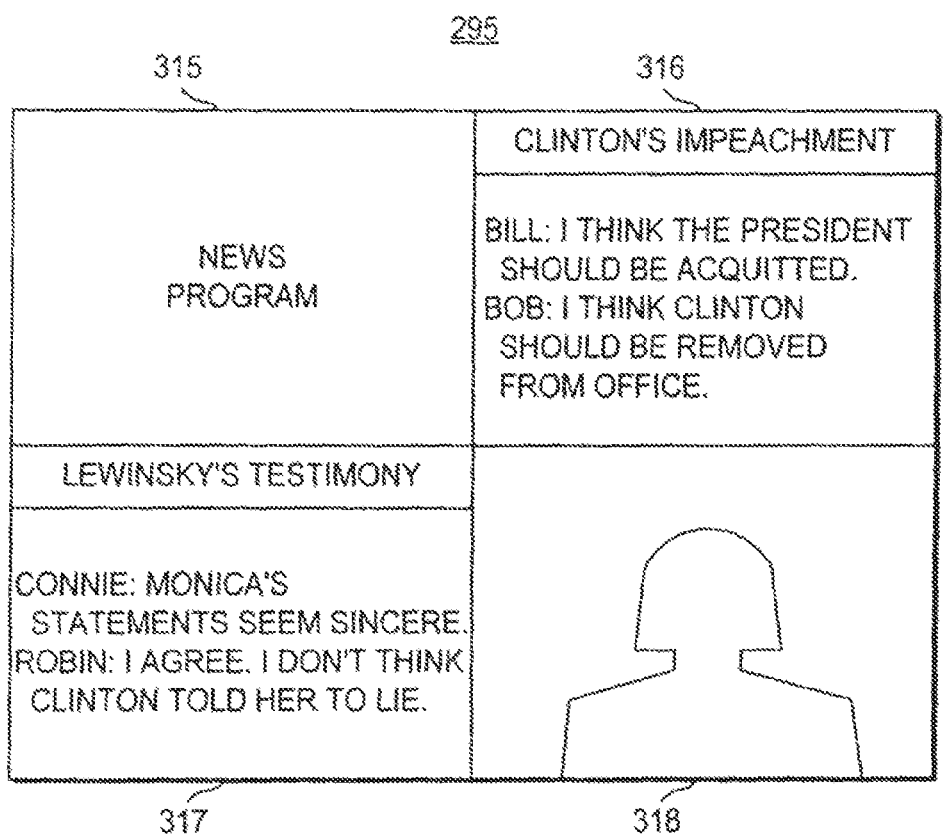
FIG. 16 is a depiction of an illustrative display screen containing multiple chat groups along with a television program in accordance with the present invention.

Television display screen 295 of FIG. 16 illustrates how the set-top box application may allow the user to participate in a plurality of chat groups concurrently. A television program called News Program is displayed in upper left quadrant 315 of television display screen 295. The user can watch News Program and participate concurrently in three different chat groups displayed in quadrants 316, 317, and 318. Textual real-time communications from two chat rooms are displayed in upper right quadrant 316 and lower left quadrant 317. Each chat topic relates to issues discussed on News Program. The topic of the chat room in quadrant 316 is Clinton's Impeachment. The topic of the chat room in quadrant 317 is Lewinsky's Testimony. The video image of a participant in a third video chat group is displayed in quadrant 318. Audio messages to and from the participants of the video chat room can be sent and received as well. If multiple chat rooms joined by the user use audio, the set-top box application may allow the user to toggle between the various groups, so that the audio component of only one group at a time is active.

Figure 17:
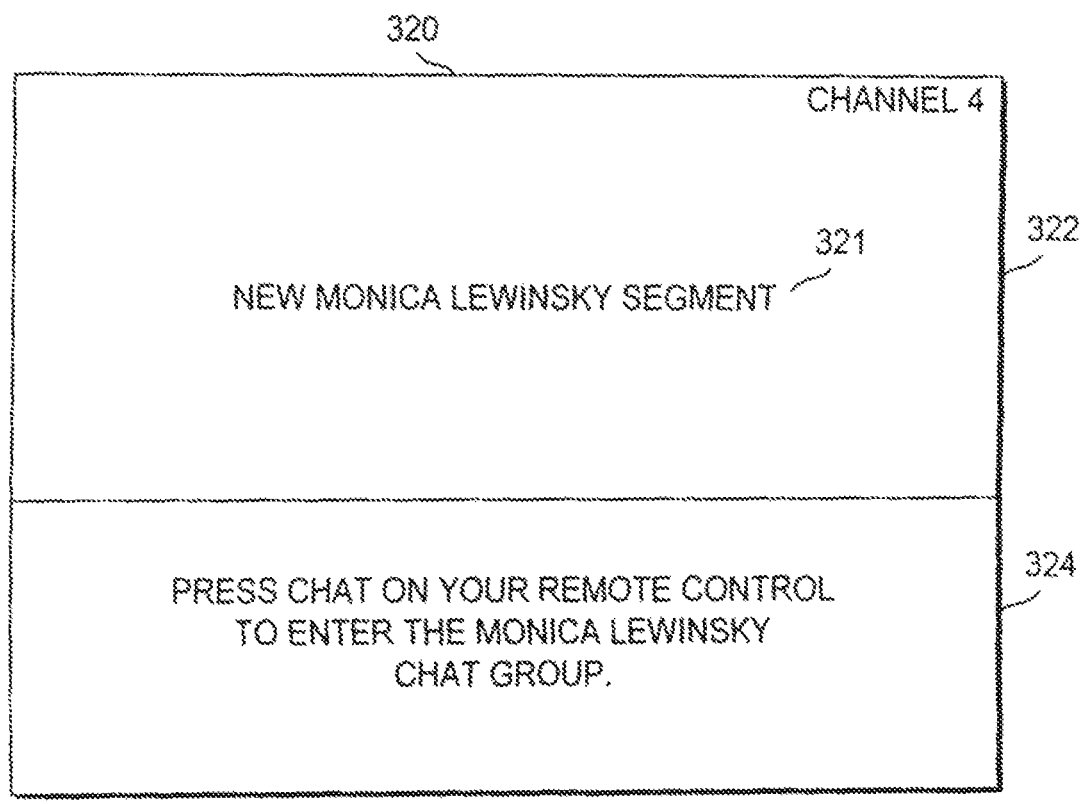
FIG. 17 is a depiction of an illustrative display screen for allowing a user to enter a chat group related to a current television program in accordance with the present invention.

Another example of a display screen that provides the user with an opportunity to enter a chat group that is related to a television program is shown in FIG. 17. The New Monica Lewinsky Segment 321 on display screen 320 of FIG. 17 is overlaid by display 324 so that only upper portion 322 of program 322 is visible. When the new Monica Lewinsky segment 321 of the television program begins, the set-top box application will automatically prompt the user to enter the Monica Lewinsky Chat Group by displaying the message shown in display 324. The Monica Lewinsky Chat Group may be a chat group of users who are watching the television program and who wish to discuss issues relating to her that are being presented on the program. The user can press the Chat button on his remote control to enter the Monica Lewinsky Chat Group, or may press cancel on his remote control to return to normal television viewing by removing the message in display 324. The chat server may be configured to support the Monica Lewinsky Chat Group only during the duration of the news program or talk show. Alternatively, the chat group may continue beyond the end of the program so that the participants can discuss follow up issues. The Monica Lewinsky Chat Group and any of the other illustrative chat groups discussed herein may be textual chat groups, audio chat groups, video chat groups (silent or with audio), or combinations of such chat groups.

Figure 18A:
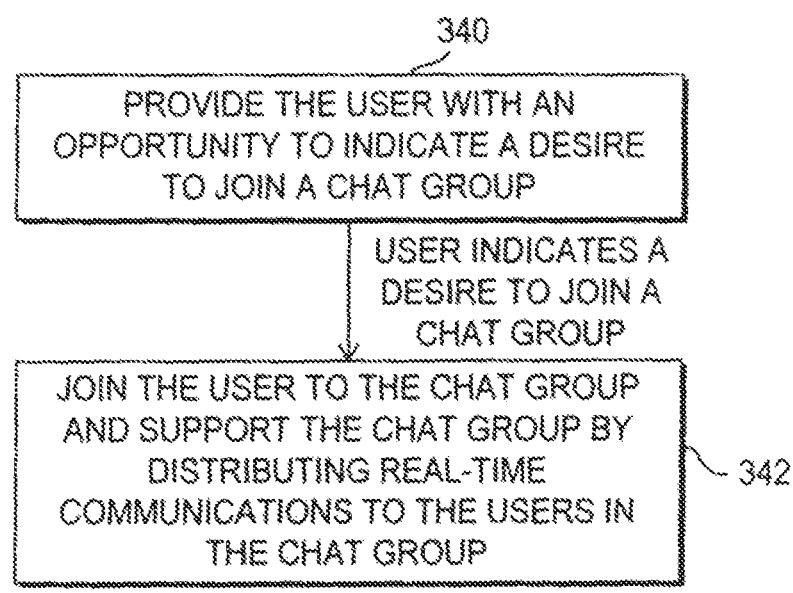
FIG. 18A is a flow chart showing the steps involved in an approach for providing a user with an opportunity to join a chat group in accordance with the present invention.

An illustrative process for permitting a user of user television equipment to join a chat group is shown in FIG. 18A. At step 340, the set-top box application implemented on the user's television equipment provides the user with an opportunity to indicate a desire to join a real-time chat group. The opportunity may be provided automatically (e.g., at a particular time during the course of a television program) or in response to a prompt by the user (e.g., the user chooses an on-screen option or an option on a program guide menu that indicates that he wishes to view available chat groups). The real-time chat group may be in the form of written, audio, or video (with audio or silent) communications or a suitable combination of such communications.

The opportunity for the user to indicate a desire to join a chat group may be provided, for example, using display screens, such as display screens 270, 280, 300, 500, or 320 of FIG. 13, 14, 15A, 15B, or 17 respectively, or any other such suitable display screens. The set-top box application may also provide the user with an opportunity to indicate a desire to join a chat group by being able to respond to a signal from another type of user interface mechanism (e.g., a dedicated chat button on a remote control).

The chat group that the user joins may be determined by the user or by the program guide. The user may be provided with an opportunity to select a chat group from a predetermined grouping or list of available chat groups as described in connection with display screens 280, 300, 500 of FIGS. 14, 15A, and 15B respectively. Option 290 of FIG. 14 provides the user with an opportunity search for more chat groups and to select a chat group based upon the results of the search. The user may be provided with an opportunity to search for a chat group based on a chat topic or by typing in the name of the chat group and other information necessary to identify the chat group. If desired, the chat system may automatically determine which chat group the user should join. For example, display screen 320 of FIG. 17 may provide the user with an opportunity to indicate a desire to join an available chat group that is related to the program being viewed. If desired, information on which chat group the user should join may be based, for example, on the number of current participants in a group, which may be limited (e.g., to a maximum of 20 participants). Information on available chat groups for may be maintained by the television distribution facility or a chat server. When a user directs a given set-top box application to join that user to a chat group, the set-top box notifies the server, which may then join the user to the next available group. Information identifying available chat groups may be provided to the set-top box application along with the television program broadcast signal and decoded by the set-top box application on the user television equipment.

After the user has indicated a desire to join a chat group, the chat system will join the user to the chat group and support the chat group by distributing real-time communications to the users in the chat group at step 342. For example, the set-top box application may make a connection to the chat equipment maintaining the real-time communications for the chat group, which then joins the user to the chat group. After the user has been joined to the chat group, the chat group is supported by the chat equipment (e.g. the chat server), and the user can send and receive real-time communications to and from other participants of the chat group. Step 342 may be performed by chat equipment at the television distribution facility, at a television channel chat facility, or separate chat equipment. If desired, equipment such as an audio or video bridge at a television distribution facility or other suitable location may be used in forming and supporting chat groups.

Figure 18B:
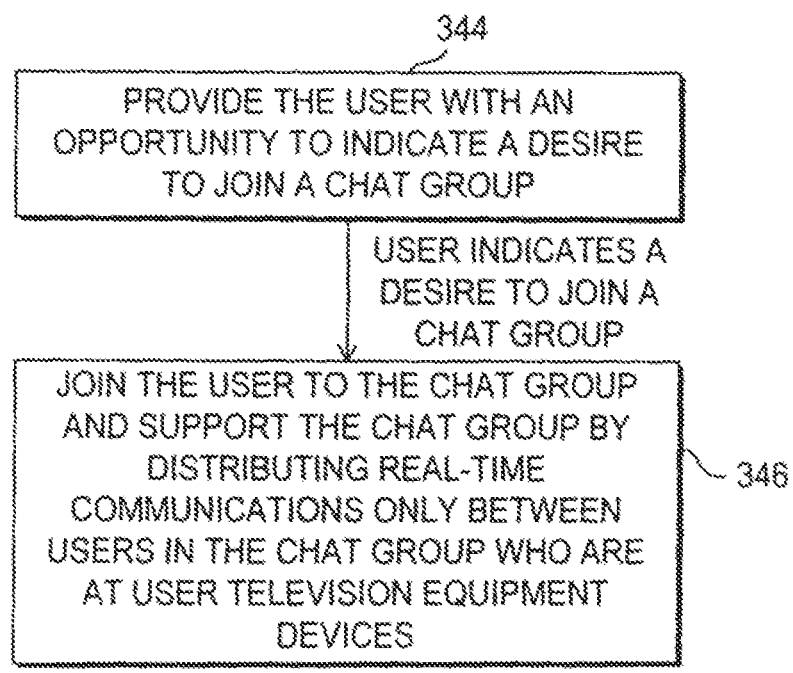
FIG. 18B is a flow chart showing the steps involved in an approach for providing a user with an opportunity to join a chat group between users at other user television equipment devices in accordance with the present invention.

Referring now to FIG. 18B, an illustrative process for permitting a user of user television equipment to join a chat group restricted to users at user television equipment devices is shown. At step 344, the set-top box application implemented on the user's television equipment provides the user with an opportunity to indicate a desire to join a chat group. The features of this step are the same as the features described above with respect to step 340 of FIG. 18A.

After the user has indicated a desire to join a chat group, the chat system will join the user to the chat group and support the chat group by distributing real-time communications only between users in the chat group who are at user television equipment devices at step 346. The set-top box application will indicate to the chat equipment to join the user to the chat group. The chat equipment will then support the chat group by distributing the real-time communications. Entry into the chat group is restricted to users at user television equipment devices. Entry may be restricted to users of user television equipment devices connected to one particular television distribution facility or users at user television equipment devices connected to one of a limited number of television distribution facilities.

The chat equipment may monitor requests to enter the chat group to ensure that all of the participants in the chat group are at a user television equipment device, as opposed to e.g. a personal computer. For example, the chat equipment could maintain entry codes with television distribution facilities to restrict access to a chat group to only users television equipment devices. Each television distribution facility would transmit the entry code along with a request from one of its user television equipment devices to the chat equipment so that the user may be joined to the chat group. Only requests to join the chat group that present a valid entry code from a television distribution facility will be recognized. If desired, access to a TV chat group may be restricted to user television equipment devices by not making the chat group available on the Internet.

Figure 18C:
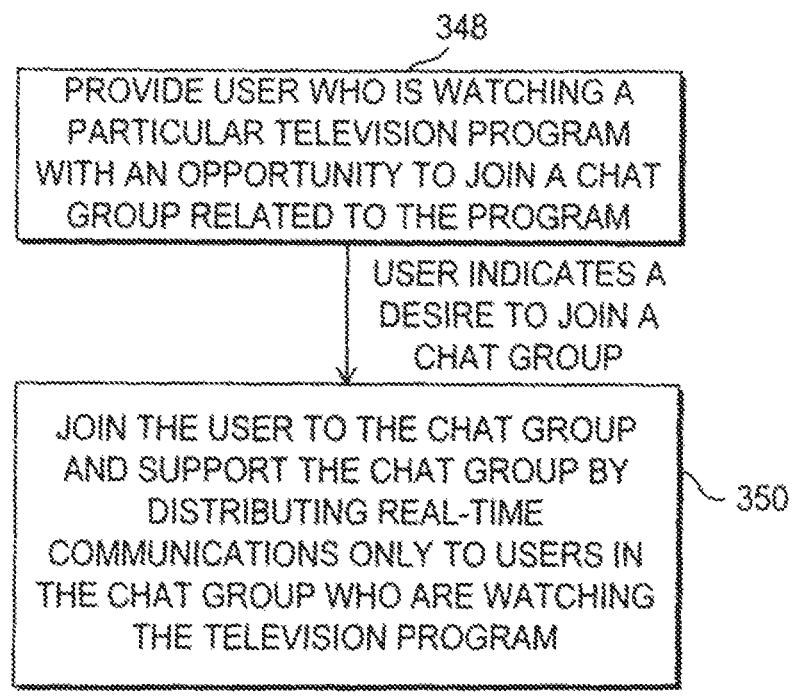
FIG. 18C is a flow chart showing the steps involved in an approach for providing a user who is watching a television program with an opportunity to join a chat group only between users who are watching the television program in accordance with the present invention.

Referring now to FIG. 18C, an illustrative process for permitting a user of user television equipment to join a chat group related to a television program that the user is watching is shown. At step 348, the set-top box application implemented on the user's television equipment provides the user who is watching a particular television program with an opportunity to join a chat group related to the program. Television display screen 300 in FIG. 15A, and television display screen 320 in FIG. 17 are examples of how the set-top application can provide the user with an opportunity to join a chat group related to a particular television program while the user is watching the program. The opportunity to join the chat group may be provided by the set-top box application automatically during the course of the television program, or upon prompting from the user, e.g. by pressing a button on a remote control.

After the user has indicated a desire to join a chat group, the chat system will join the user to the chat group and support the chat group by distributing real-time communications only between users in the chat group who are watching the same television program at step 350. The set-top box application will indicate to the chat equipment to join the user to the chat group. The chat equipment will then support the chat group by distributing the real-time communications only between users in the chat group who are watching the program. Each set-top box application will ensure that the user is not provided with an opportunity to join the chat group unless the user has tuned into the channel that is broadcasting the television program. If desired, the user can have the option of joining the chat group related to the program at any time, but the set-top box application will tune to the television program as soon as the user indicates a desire to join the chat group related to the program.

Figure 19:
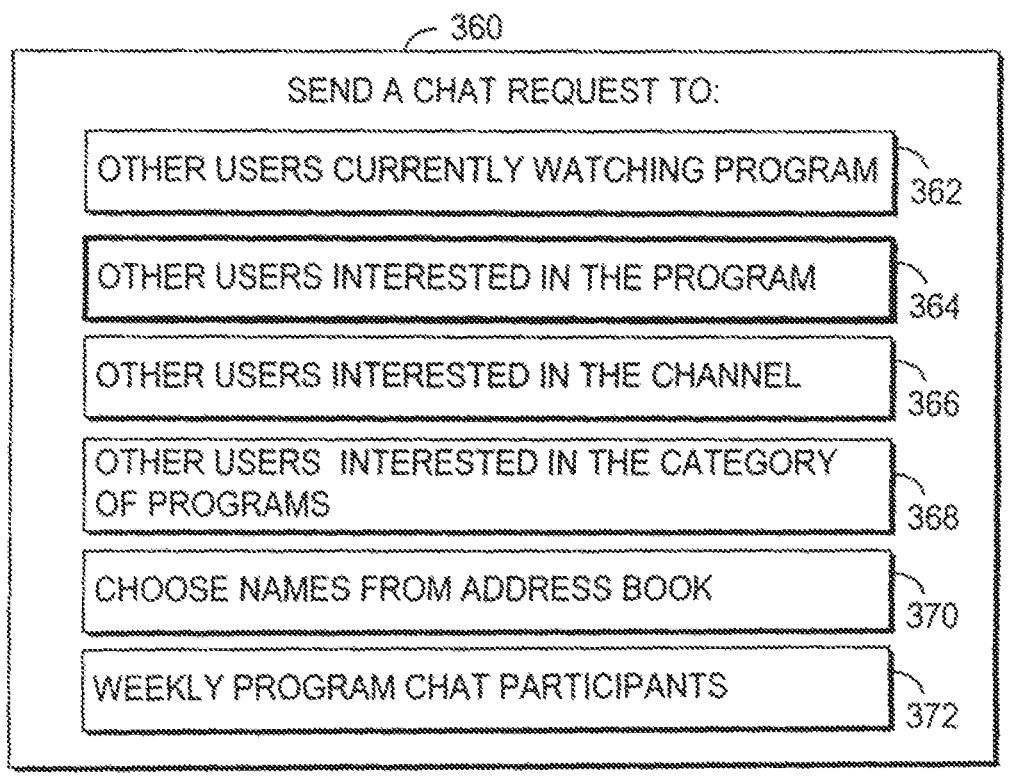
FIG. 19 is a depiction of an illustrative display screen that allows a user to send a chat request to other users in accordance with the present invention.

Another aspect of the present invention involves providing the user with an opportunity to send a chat request to other users who may be interested in joining a chat group. A chat request is a request for other users (of e.g. a television set-top box application or interactive television program guide) to join a chat group. An illustrative chat request display screen 360 that may be used to provide a user with an opportunity to chose groups of other users who may be interested in joining a chat group from a list is shown in FIG. 19.

The user may send a chat request to all other users currently watching the same television program that the user is tuned into by choosing option 362. The chat system would then distribute the chat request to the recipients via the communications pathways and networks shown in FIG. 1A, 2A, 2B, or 3. The chat equipment may distribute all the chat requests it receives that are addressed to users associated with a television distribution facility to each set of user television equipment connected to that television distribution facility. The chat requests may then be filtered by the set-top box application at the recipient's user television equipment. The set-top box application may only display the chat request on the recipient's television screen if the recipient user is watching the television program related to the chat request. The user may also block at his set-top box all incoming chat requests, or chat requests that are sent by specific individuals. If desired, the set-top box may be configured to only notify the user of chat request sent by certain individuals. Also, the user may indicate to his set-top box application that he only wishes to receive chat requests that are related to particular programs, channels, or categories of programs. The set-top box application would then only display incoming chat requests on the television based upon the user's indicated preferences.

Figure 20:
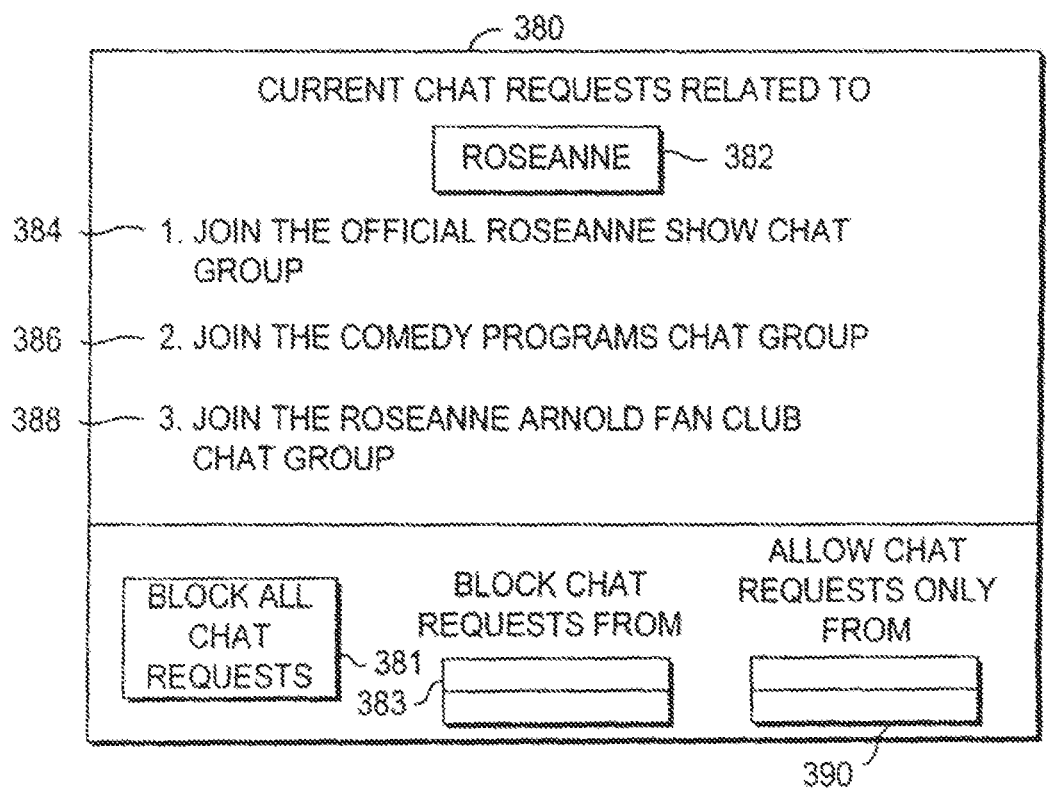
FIG. 20 is a depiction of an illustrative display screen for displaying chat requests in accordance with the present invention.

If desired, any user may view all of the available chat requests that are related to a given television program as a potential recipient of a chat request. Display screen 380 of FIG. 20 is an example of a menu format that may be used to present recipient users with an opportunity to accept a chat request related to the current television program (option 382). The chat requests displayed in display screen 380 may also be related to a non-current television program chosen from the program listings, a channel, or any category of programs. This information would also be displayed as part of option 382. Incoming chat requests may be displayed in a list as part of display screen 380. The recipient user may accept a chat request and join the corresponding chat group by choosing one of chat request options 384, 386 or 388. In the example of FIG. 20, the recipient user may join a chat group by entering the number of a desired chat request on the remote control. The user may also have the ability to block all incoming chat requests for a period of time or indefinitely by selecting option 381. This feature allows a user to maintain privacy. The user may block incoming chat requests from certain individuals by entering their names or addresses in regions 383. The user may also program the chat system so that it only allows chat requests from certain individuals to be received by that user's set-top box. The user may enter the names or addresses of these individuals in regions 390. The user can decline to join any of the chat groups that he is being requested to join by pressing a Cancel button on the remote control.

Referring again to FIG. 19, a user who desires to send a chat request may choose to send a chat request to other users who are interested in the particular television program that the sender user is tuned into by choosing option 364. Option 364 is highlighted to indicate that it has been selected by the sender user. The sender user can use arrow keys on his remote control to select option 364. The user may then press an OK button on the remote control to enter his selection. The sender user may select option 366 to send a chat request to other users who are interested in the channel broadcasting the current program. The sender user may also select option 368 to send a chat request to other users who are interested in the category of programs that matches the category of the program the user is currently watching.

The chat request can be sent to chat equipment (e.g. server) that forwards the chat request to the appropriate recipients. For example, chat requests may be sent to users who have indicated to the chat equipment or television distribution facility that they have an interest in receiving chat requests regarding a particular program, channel, or category of programs. If desired, the set-top box application may assist in the filtering process used to ensure that the chat requests are only delivered to the appropriate users. For example, if a chat request is to be distributed to all users tuned to channel 4, the chat server at a television distribution facility may distribute a chat request to all users with information that specifies that the request is to be restricted to viewers whose set-top boxes are currently tuned to channel 4. The set-top box application of each recipient user determines whether the user is tuned to channel 4. If the set-top box is not tuned to channel 4, the chat request is not displayed. Some filtering operations may be performed at the server end.

If desired, users can specify certain chat preferences to the chat equipment. For example, a user can specify that he wishes to receive chat requests relating to particular programs, channels, or categories of programs. The user may also specify that we wishes to block at his set-top box all incoming chat requests, or chat requests that are sent by specific individuals. The user may even specify that he wishes to only receive chat request sent by certain individuals. This information can then be sent to the chat equipment, the television distribution facility, or the television channel chat facility. Profile data regarding a household user's preferences entered through a display screen provided by the set-top box application such as display screen 120 of FIG. 4 can be sent to the chat equipment associated with the household, so that the chat equipment may use this information for filtering chat requests that are related to television programs, channels, or categories of television programs that a user is interested in. With this arrangement, only the filtered chat requests are sent by the chat equipment to the recipient user.

The chat system may allow a user to send a chat request only to non-household users in the user's personal address book who have been identified as having an interest in a program, channel, or category of programs related to the chat request. The chat system may filter out only those other users in the address book whose preferences match the program, channel, or category of programs related to the chat request. The preferences of other users may be stored in the address book along with users' names and addresses. A user interface such as display screen 160 of FIG. 6 may be provided by the set-top box application to enter such user preference information.

A user may select names of other users from his address book by choosing option 370. In this case, the chat request would only be sent to the particular people that the user individually chooses from his address book. Such a chat request may be displayed on the television screen of the user receiving the chat request automatically as soon as the chat request is received. If desired, the chat system may be configured to only have the ability to send chat requests to people on the user's buddy list or address book. In addition, the chat system may be configured so that a user only receives chat requests from people on his buddy list or address book. The functionality of the filtering operations described with respect to the television chat system of the present invention may be performed at a server, at the set-top box of the recipient, or at the set-top box of the sender.

Display screen 360 may also present option 372 which allows the user to send a chat request to a list of individuals that may want to participate in a chat group related to the current program. For example, the individuals in the list may be the usual participants in a chat group related to a weekly sitcom. The list may be created by the user as he determines the identities of the weekly participants.

Figure 21:
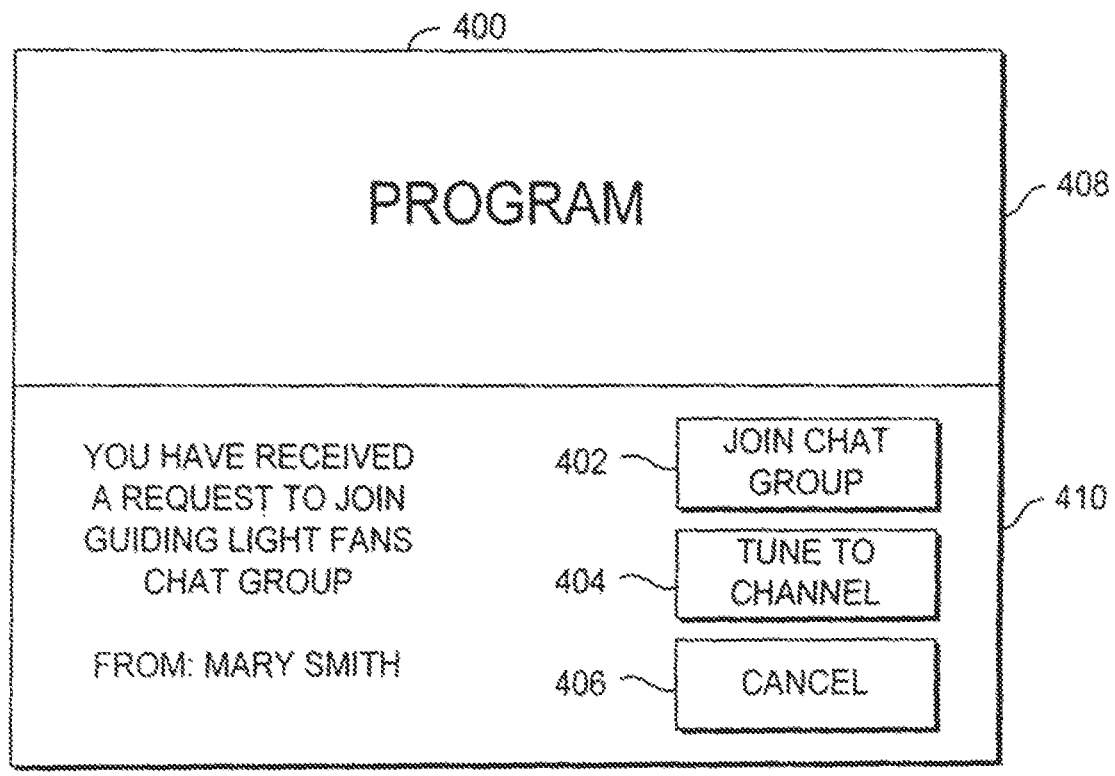
FIG. 21 is a depiction of an illustrative display screen for displaying a chat request and permitting a user to join the chat group and/or tune to the related channel in accordance with the present invention.

As shown in FIG. 21, display screen 400 may be used to display a chat request 410 in the lower portion of the recipient user's television screen. Chat request 410 overlays the television program the user is watching. Chat request 410 may be translucent so as to minimize interruption in the user's viewing of the program. The program is still unobscured in upper portion 408. Chat request 410 indicates the name of the chat group that the recipient of the request is being asked to join and the name of the sender of the chat request. The chat request recipient may accept the chat request and join the chat group by selecting option 402. The chat request recipient can tune to the channel that the program is airing on by selecting option 404. The chat request recipient may decline the chat request by selecting option 406. The recipient may be allowed to block future requests from a recipient, or to go "private" i.e. not allow any chat requests in from anybody until further notice.

Figure 22:
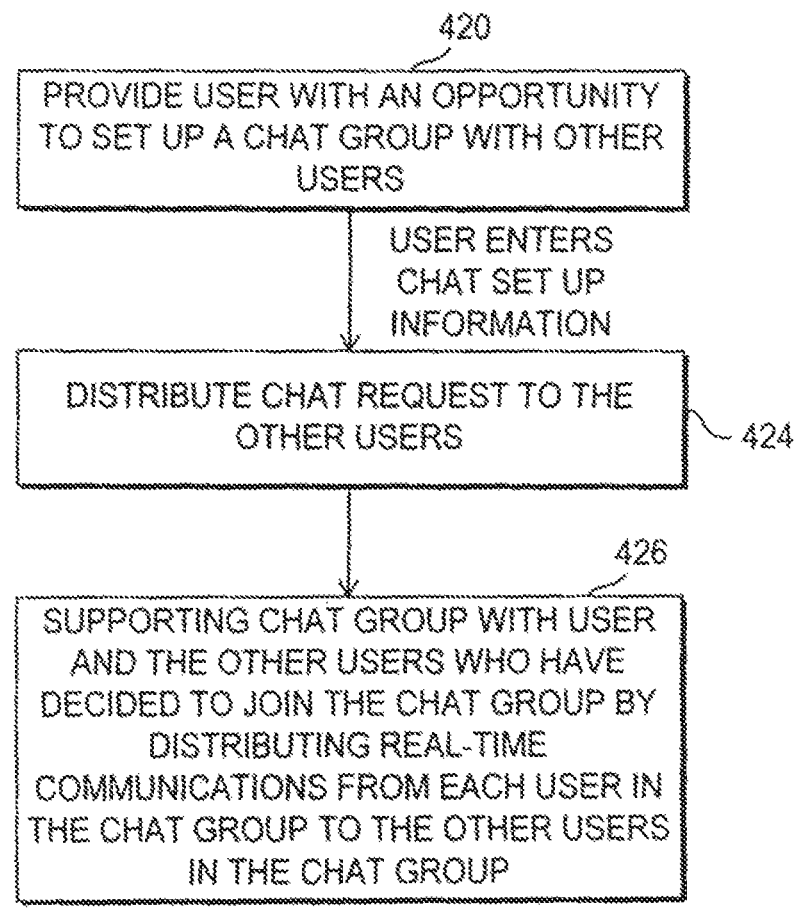
FIG. 22 is a flow chart showing steps involved in an approach for distributing a chat request and supporting a chat group with the user and other users in accordance with the present invention.

An illustrative process for permitting a user at user television equipment to establish a chat group between himself and other users is shown in FIG. 22. At step 420, the set-top box application implemented on the user's television equipment provides the user with an opportunity to set up a chat group with other users. This opportunity may be provided by the set-top box using any appropriate user interface. Display screen 360 of FIG. 19 is an example of a user interface that provides the user with an opportunity to set up a chat group with other users by sending them a chat request. Other suitable arrangements may be used to implement the feature of step 420 if desired.

Following step 420, the user may enter chat setup information. The chat setup information may include, for example, an identification of the intended recipients of the chat request, the name of the chat group, an identification of the chat server that will support the chat group, the television program that the chat group will be related to, and the channel that the program is being broadcasted on. If desired, at least some of this information may be automatically inserted by the set-top box application. For example, because the set-top box application knows the channel to which the sender user's set-top box is tuned, the set-top box application may automatically append this information to the chat request. The set-top box application may also determine which program the sender user is watching by accessing a database (e.g., a program listings database stored locally on the set-top box or on a server) and using information on the current time (e.g. which the set-top box or server has access to using a clock). If desired, some of this type of information may be appended to the chat request by the chat equipment or chat server. For example, the set-top box application may provide the chat server with information on which channel the sender user is currently tuned to and the chat server may then determine which program is currently being watched (from program listings information stored at the television distribution facility) and may append this information to the chat request.

At step 424, the chat system distributes the chat request to the other users who may be interested in joining the chat group. The actual recipients of the chat request can be determined by the chat server, by the user television equipment, at the television distribution facility, at the television channel chat facility, or a combination thereof. If desired, the chat request that is distributed may be blocked at the recipient's set-top box (e.g., if that recipient has directed his set-top box application not to accept such requests).

At step 426, the chat system supports the chat group with the user and the other users who have decided to join the chat group by distributing real-time communications from each user in the chat group to the other users in the chat group. The chat group may be supported by chat equipment such as a chat server. The other users may be notified of the chat group and given an opportunity to join it when the chat request appears on their television screens as shown and described with respect to FIGS. 20 and 21. The group of other users who have decided to join the chat group may be those who have accepted the chat request or those who have previously indicated a desire to join a chat group.

Figure 13:
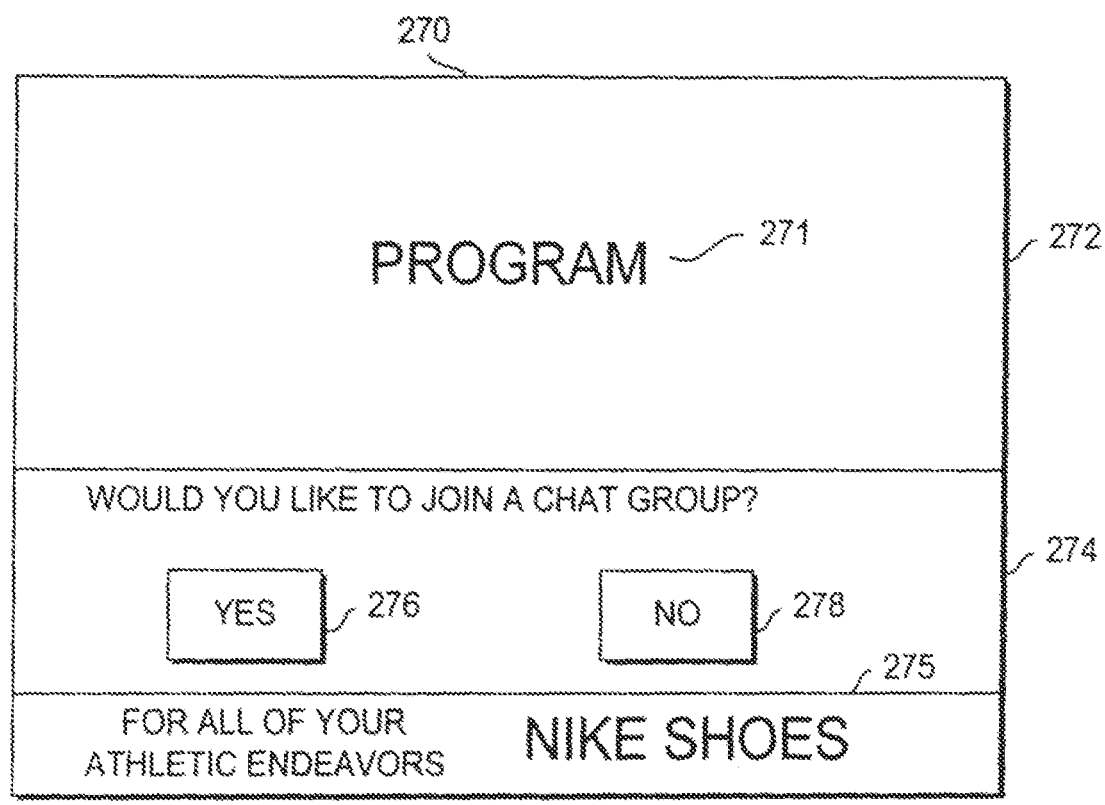
FIG. 13 is a depiction of an illustrative display screen that allows a user to join a chat group in accordance with the present invention.
Figure 23:
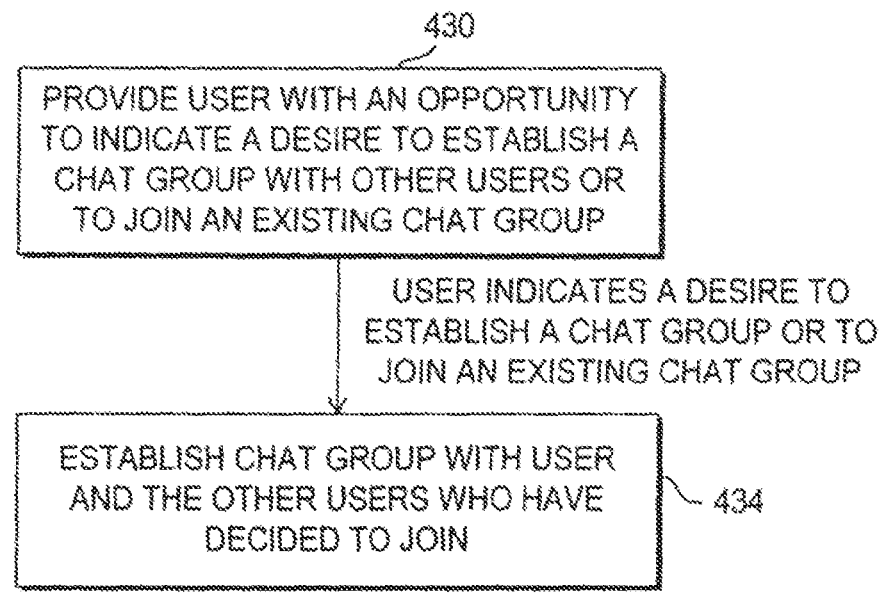
FIG. 23 is a flow chart showing steps involved in an approach for establishing a chat group with the user and other users in accordance with the present invention.

An illustrative process for establishing a chat group with the user and other users is shown in FIG. 23. At step 430, the set-top box application implemented on the user television equipment provides the user with an opportunity to indicate a desire to establish a chat group with other users or to indicate a desire to join an existing chat group. Option 286 in television display screen 280 of FIG. 14 is an example of how the set-top box application may provide the user with an opportunity to indicate a desire to create a new chat group. User interface region 274 of FIG. 13 is an example of how the set-top box application may provide the user with an opportunity to indicate a desire to join an existing chat group or a chat group that is about to be formed. Following step 430, users indicate their desire to establish a chat group or to join an existing chat group or chat group that is about to be formed, for example, by selecting option 276 in FIG. 13 or by selecting option 286 in FIG. 14. The user may also enter chat set up information such as the name of the chat group.

At step 434, the chat system establishes a chat group joining the user and the other users who have decided to join. The chat group may be a new chat group that is created, for example, on a chat server, and the user may be joined to that new chat group. The chat group may also be an existing chat group to which the user is joined.

In the case of a new chat group, a new chat group is created on a chat server or using other suitable equipment, such as an audio or video bridge. The user is then joined to the chat group. The other users who have decided to join are also joined to the new chat group once it has been created. All of the users are now able to send and receive real-time communications from the other participants in the chat group. Step 434 may be performed by the chat equipment (e.g., a server or an audio or video bridge), by the set-top box application on the user television equipment, or a combination of both.

Users can then access a list of currently available chat groups related to a television program or channel from their television distribution facility, from a television channel chat facility, or directly from the chat equipment (e.g. server) through the set-top box application. The chat system can join the user to a selected chat group or groups through a process such as the ones described in connection with FIGS. 18A and 23.

Figure 24:
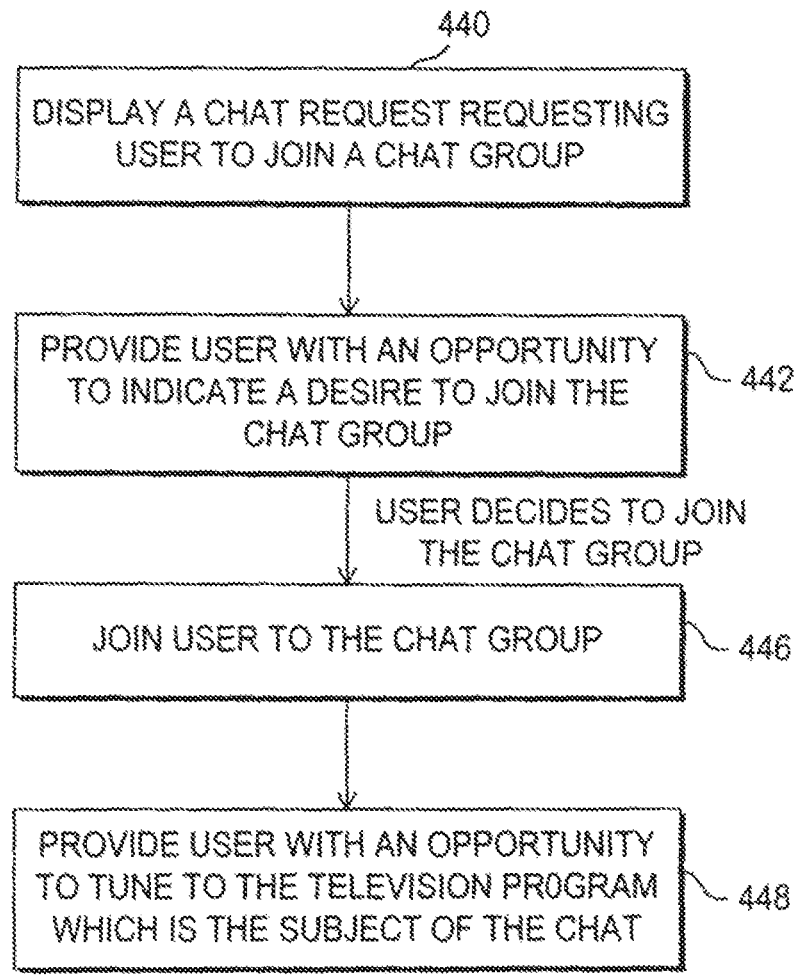
FIG. 24 is a flow chart showing steps involved in an approach for joining the user to a chat group in response to a chat request in accordance with the present invention.

An illustrative process for joining a user to a chat group in response to a chat request is shown in FIG. 24. At step 440, the set-top box application on the user's television equipment displays a chat request that asks the user to join a chat group. At step 442, the set-top box application provides the user with an opportunity to indicate a desire to join the chat group. Display screens 380 in FIGS. 20 and 400 in FIG. 21 are examples of how the set-top box may display chat requests and provide the user with an opportunity to join a chat group in response to a chat request.

Following step 442, when the user has decided to join a chat group linked to a chat request, the chat system joins the user to the chat group at step 446. For example, if the chat group is running on a chat server, the user is linked to the chat group on that server. If the chat group is implemented using audio or video conferencing equipment, the user is linked to the chat group by connecting the user to the group with the audio or video conferencing equipment. The chat group information required to connect the user to the chat group may be provided to the chat equipment with the chat request. After the user is joined to the chat group, the user may send and receive real-time communications from the other participants in the chat group.

At step 448, the set-top box application provides the user with an opportunity to tune to the television program that is the subject of the chat. Option 404 of FIG. 21 is an example of how the user may be provided with an opportunity to tune to the television program that is the subject of the chat. If the user selects this option, the set-top box will automatically tune to the television channel that is broadcasting the television program that is the subject of the chat. Information on which channel is broadcasting the program related to the chat request may be provided to the user's set-top box with the chat request. This feature allows the user to participate in the chat group and to view the television program that is the subject of the chat simultaneously. Step 448 is optional and may be omitted if desired.

Figure 25:
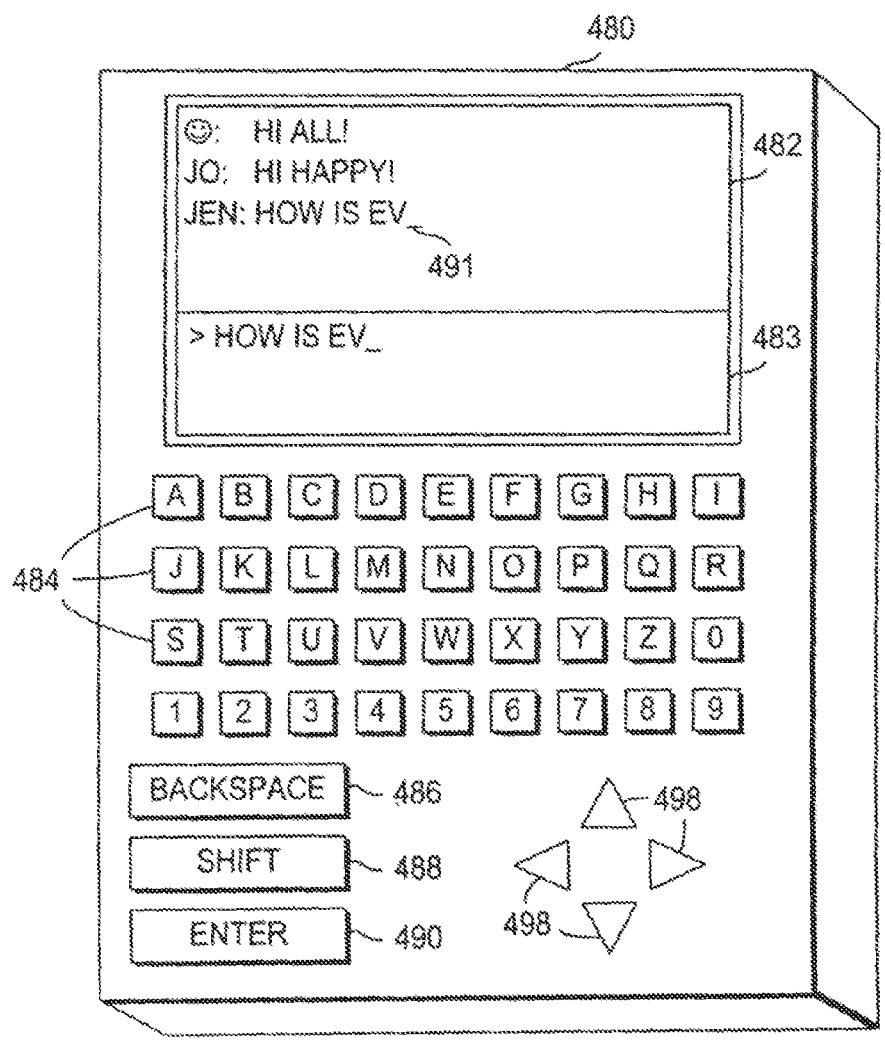
FIG. 25 is a diagram of an illustrative two-way interactive display remote control device for sending and receiving chat messages in a chat group and chat requests in accordance with the present invention.

Many of the features of the present invention may be used with a two-way interactive display remote control. An example of a display remote control is shown in FIG. 25. Display remote control 480 contains display screen 482 which may be any suitable type of display screen. A user may compose a chat message in a chat room to another user using buttons 484. Pressing any of buttons 484 causes the selected letter or number to simultaneously appear in input region 483 and adjacent to cursor 491. The user may delete a letter or number by pressing Backspace button 486, and may enter upper case letters by pressing Shift button 488. The user may move the cursor in display region 483 of display screen 482 using arrow buttons 498. A user may use an icon such as the smiley face in display screen 482 to represent himself. A display remote control may also have a touch screen. Some or all of the keys (e.g. the alphabet keys) may be presented on the display, rather than having regular keys.

The display remote control gives the user additional privacy when sending and receiving messages in a chat group. The display remote may also be used for sending and receiving chat requests. The display remote control is therefore a two-way interactive remote in that messages may be composed and sent, as well as received and read by the user. Further features of an illustrative display remote control are described in Herrington et al. U.S. provisional patent application Ser. No. 60/138,868, filed Jun. 31, 1999, which is hereby incorporated by reference herein in its entirety. A display remote may also be used for 1.0 sending messages between users. Further features of an illustrative television message system are described in McKissick et al. U.S. patent application Ser. No. 09/356,245, filed concurrently herewith, which is hereby incorporated by reference herein in its entirety.

The foregoing is merely illustrative of the principles of this invention and various modifications can be made by those skilled in the art without departing from the scope and spirit of the invention.

The invention claimed is:

1. A method comprising:
    receiving, from a first device, an indication of a television program from a first user;
    in response to the receiving the indication, generating a message related to the indicated television program and a selectable option that enables a second user to access the indicated television program; and
    transmitting to a second device of the second user the message and the selectable option, wherein the message is displayed together with the selectable option on the second device, and wherein the selectable option is a button that is displayed proximate to the displayed message.

2. The method of claim 1, wherein the message comprises a title of the indicated program.

3. The method of claim 1, wherein the second device is configured to display the indicated program in response to receiving a selection of the selectable option.

4. The method of claim 1, further comprising enabling the second user to access the indicated program in response to receiving a selection of the selectable option.

5. The method of claim 1, further comprising generating for display the indicated program on the second device.

6. The method of claim 1, further comprising generating the message and the selectable option to be displayed together on the second device to the second user.

7. A non-transitory machine-readable medium comprising instructions thereon, the instructions comprising:
    instructions to receive, from a first device, an indication of a television program from a first user;
    instructions to generate a message related to the indicated television program and a selectable option that enables a second user to access the indicated television program in response to the receiving the indication; and
    instructions to transmit to a second device of the second user the message and the selectable option, wherein the message is displayed together with the selectable option on the second device, and wherein the selectable option is a button that is displayed proximate to the displayed message.

8. The non-transitory machine-readable medium of claim 7, wherein the message comprises a title of the indicated program.

9. The non-transitory machine-readable medium of claim 7, wherein the second device is configured to display the indicated program in response to receiving a selection of the selectable option.

10. The non-transitory machine-readable medium of claim 7, further comprising instructions to enable the second user to access the indicated program in response to receiving a selection of the selectable option.

11. The non-transitory machine-readable medium of claim 7, further comprising instructions to generate for display the indicated program on the second device.

12. The non-transitory machine-readable medium of claim 7, further comprising instructions to generate the message and the selectable option to be displayed together on the second device to the second user.

13. A method comprising:
receiving, responsive to input from a first user at a first device, information associated with a television program, wherein the information is based on input from a second user at a second device;
in response to the receiving the information associated with the television program, generating a display related to the television program, wherein the display comprises a message related to the television program and a selectable option that enables the first user to access the television program, and wherein the selectable option is a button that is displayed proximate to the displayed message;
receiving an indication that the first user has selected the selectable option; and
in response to the receiving the indication, enabling the first user to access the television program at the first device.

14. The method of claim 13, wherein the display comprises a title of the program.

15. The method of claim 13, wherein the first device is configured to display the program in response to receiving a selection of the selectable option.

16. The method of claim 13, further comprising enabling the first user to access the program in response to receiving a selection of the selectable option.

17. The method of claim 13, further comprising generating the program for display on the first device.

18. A non-transitory machine readable medium comprising instructions thereon, the instructions comprising:
instructions to receive, responsive to input from a first user at a first device, information associated with a television program, wherein the information is based on input from a second user at a second device;
instructions to generate a display related to the television program in response to receiving the information associated with the television program, wherein the display comprises a message related to the television program and a selectable option that enables the first user to access the television program, and wherein the selectable options is a button that is displayed proximate to the displayed message;
instructions to receive an indication that the first user has selected the selectable option; and
instructions to enable the first user to access the television program at the first device in response to receiving the indication.

19. The non-transitory machine-readable medium of claim 18, wherein the display comprises a title of the program.

20. The non-transitory machine-readable medium of claim 18, wherein the first device is configured to display the program in response to receiving a selection of the selectable option.

21. The non-transitory machine-readable medium of claim 18, further comprising instructions to enable the first user to access the program in response to receiving a selection of the selectable option.

22. The non-transitory machine-readable medium of claim 18, further comprising instructions to generate the program for display on the first device.

\* \* \* \* \*